US012809127B2

(12) United States Patent
Lee

(10) Patent No.: US 12,809,127 B2
(45) Date of Patent: Nov. 24, 2026

(54) WIDE-ANGLE LENS ASSEMBLY

(71) Applicants: Sintai Optical (Shenzhen) Co., Ltd., ShenZhen City (CN); Asia Optical Co., Inc., Taichung (TW)

(72) Inventor: Jian-Wei Lee, Taichung (TW)

(73) Assignees: SINTAI OPTICAL (SHENZHEN) CO., LTD., Shenzhen City (CN); ASIA OPTICAL CO., INC., Taichung (TW)

( * ) Notice: Subject to any disclaimer, the term of this patent is extended or adjusted under 35 U.S.C. 154(b) by 254 days.

(21) Appl. No.: 18/760,174

(22) Filed: Jul. 1, 2024

(65) Prior Publication Data

US 2025/0035887 A1 Jan. 30, 2025

(30) Foreign Application Priority Data

Jul. 26, 2023 (CN) ......................... 202310926290.1

(51) Int. Cl.
*G02B 9/64* (2006.01)
*G02B 13/06* (2006.01)

(52) U.S. Cl.
CPC ............... *G02B 9/64* (2013.01); *G02B 13/06* (2013.01)

(58) Field of Classification Search
CPC ..... G02B 15/146; G02B 9/64; G02B 13/0045
See application file for complete search history.

(56) References Cited

U.S. PATENT DOCUMENTS 11,231,565 B2 1/2022 Chen
11,709,339 B2 7/2023 Dong et al.
2023/0064577 A1 3/2023 Tsai
2023/0133460 A1 5/2023 Yang et al.
2023/0168467 A1 6/2023 Lee et al.
2024/0176110 A1* 5/2024 Kuo ................... G02B 13/0045

FOREIGN PATENT DOCUMENTS

CN 110824664 A 2/2020
CN 110989136 A 4/2020
CN 112363300 A 2/2021
CN 112433346 A 3/2021
CN 113376797 A 9/2021
CN 215729053 U 2/2022
CN 115793185 A 3/2023
CN 116107067 A 5/2023
EP 1837694 A1 9/2007

(Continued)

*Primary Examiner* — Joseph P Martinez

(74) *Attorney, Agent, or Firm* — McClure, Qualey & Rodack, LLP

(57) ABSTRACT

A wide-angle lens assembly includes a first, a second, a third, a fourth, a fifth, a sixth, a seventh, and an eighth lenses, all of which are arranged in order from an object side to an image side along an optical axis and are spaced apart with air gaps formed therebetween. The first lens is a meniscus lens with negative refractive power. The second lens is a meniscus lens with refractive power and includes a concave surface facing the object side and a convex surface facing the image side. The third lens and the fourth lens are with positive refractive power. The fifth lens is with negative refractive power. The sixth lens is with refractive power. The seventh lens is with positive refractive power and includes a convex surface facing the image side. The eighth lens is with refractive power and includes a convex surface facing the object side.

20 Claims, 16 Drawing Sheets

(56) References Cited

FOREIGN PATENT DOCUMENTS

| | | | |
|---|---|---|---|
| TW | 202008024 | A | 2/2020 |
| TW | 202011073 | A | 3/2020 |
| TW | M632271 | U | 9/2022 |
| TW | M636349 | U | 1/2023 |
| TW | 202309585 | A | 3/2023 |
| TW | 202321766 | A | 6/2023 |
| WO | 2021168662 | A1 | 9/2021 |

* cited by examiner

WIDE-ANGLE LENS ASSEMBLY

BACKGROUND OF THE INVENTION

Field of the Invention

The present invention relates to a wide-angle lens assembly.

Description of the Related Art

The current development trend of a wide-angle lens assembly is toward large field of view. Additionally, the wide-angle lens assembly is developed to have miniaturization and high resolution in accordance with different application requirements. However, the known wide-angle lens assembly can't satisfy such requirements. Therefore, the wide-angle lens assembly needs a new structure in order to meet the requirements of large field of view, miniaturization, and high resolution at the same time.

BRIEF SUMMARY OF THE INVENTION

The invention provides a wide-angle lens assembly to solve the above problems. The wide-angle lens assembly of the invention is provided with characteristics of an increased field of view, a decreased total lens length, an increased resolution, and still has a good optical performance.

The wide-angle lens assembly in accordance with an exemplary embodiment of the invention includes a first lens, a second lens, a third lens, a fourth lens, a fifth lens, a sixth lens, a seventh lens, and an eighth lens. The first lens is a meniscus lens with negative refractive power. The second lens is a meniscus lens with refractive power and includes a concave surface facing an object side and a convex surface facing an image side. The third lens is with positive refractive power. The fourth lens is with positive refractive power. The fifth lens is with negative refractive power. The sixth lens is with refractive power. The seventh lens is with positive refractive power and includes a convex surface facing the image side. The eighth lens is with refractive power and includes a convex surface facing the object side. The first lens, the second lens, the third lens, the fourth lens, the fifth lens, the sixth lens, the seventh lens, and the eighth lens are arranged in order from the object side to the image side along an optical axis. The first lens, the second lens, the third lens, the fourth lens, the fifth lens, the sixth lens, the seventh lens, and the eighth lens are spaced apart with air gaps formed therebetween.

In another exemplary embodiment, the second lens is with negative refractive power.

In yet another exemplary embodiment, the sixth lens is with positive refractive power.

In another exemplary embodiment, the fifth lens includes a concave surface facing the image side, and the seventh lens is a meniscus lens and further includes a concave surface facing the object side.

In yet another exemplary embodiment, the wide-angle lens assembly satisfies at least one of the following conditions: $-14<f2/f<0$; $2.5\leq TTL/f\leq 4.5$; $-11<(R21+R22)/(R21-R22)<0$; $1\leq f123/f\leq 3.2$; 8.5 degrees/mm$\leq\theta/TTL\leq$10 degrees/mm; $-10.99\leq(R21+R22)/CT2\leq -7.04$; $39.16\leq(R61+R62)/CT6\leq 109.93$; $14.22\leq TTL/T34\leq 27.12$; $46.71\leq TTL/T67\leq 92.54$; wherein f is an effective focal length of the wide-angle lens assembly, f2 is an effective focal length of the second lens, f123 is an effective focal length of a combination of the first lens, the second lens, and the third lens, TTL is an interval from an object side surface of the first lens to an image plane along the optical axis, R21 is a radius of curvature of an object side surface of the second lens, R22 is a radius of curvature of an image side surface of the second lens, R61 is a radius of curvature of an object side surface of the sixth lens, R62 is a radius of curvature of an image side surface of the sixth lens, CT2 is an interval from the object side surface of the second lens to the image side surface of the second lens along the optical axis, CT6 is an interval from the object side surface of the sixth lens to the image side surface of the sixth lens along the optical axis, T34 is an interval from an image side surface of the third lens to an object side surface of the fourth lens along the optical axis, T67 is an interval from the image side surface of the sixth lens to an object side surface of the seventh lens along the optical axis, and $\theta$ is a half field of view of the wide-angle lens assembly.

In another exemplary embodiment, the eighth lens is with positive refractive power.

In yet another exemplary embodiment, the eighth lens is with negative refractive power.

In another exemplary embodiment, the fifth lens includes a concave surface facing the image side, and the seventh lens is a biconvex lens and further includes another convex surface facing the object side.

In yet another exemplary embodiment, the third lens is a biconvex lens and includes a convex surface facing the object side and another convex surface facing the image side, the fifth lens includes a concave surface facing the object side, and the eighth lens is a meniscus lens and further includes a concave surface facing the image side.

In another exemplary embodiment, the first lens is a meniscus lens and includes a convex surface facing the object side and a concave surface facing the image side, the fourth lens is a biconvex lens and includes a convex surface facing the object side and another convex surface facing the image side, and the sixth lens is a meniscus lens and includes a convex surface facing the object side and a concave surface facing the image side.

In yet another exemplary embodiment, the sixth lens is with negative refractive power.

In another exemplary embodiment, the fifth lens includes a convex surface facing the image side, and the seventh lens is a biconvex lens and further includes another convex surface facing the object side.

In yet another exemplary embodiment, the eighth lens is with positive refractive power.

In another exemplary embodiment, the wide-angle lens assembly further includes a stop disposed between the third lens and the fourth lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
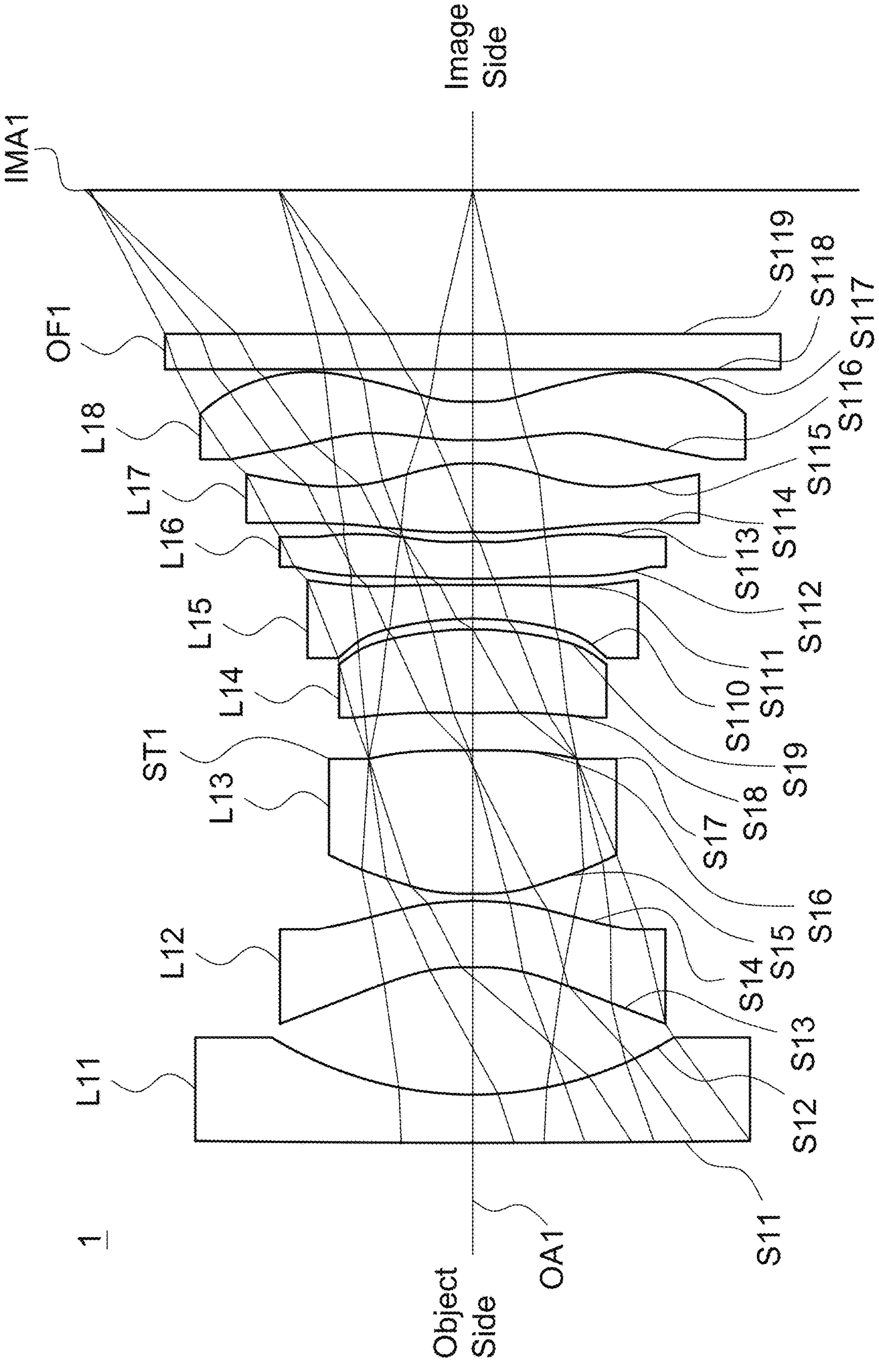
FIGS. 1, 2, 3, 4, 5 are lens layout and optical path diagrams of a wide-angle lens assembly in accordance with a first, a second, a third, a fourth, and a fifth embodiments of the invention, respectively.

The following description is made for the purpose of illustrating the general principles of the invention and should not be taken in a limiting sense. The scope of the invention is best determined by reference to the appended claims.

The present invention provides a wide-angle lens assembly including a first lens, a second lens, a third lens, a fourth lens, a fifth lens, a sixth lens, a seventh lens, and an eighth lens. The first lens is a meniscus lens with negative refractive power. The second lens is a meniscus lens with refractive power and includes a concave surface facing an object side and a convex surface facing an image side. The third lens is with positive refractive power. The fourth lens is with positive refractive power. The fifth lens is with negative refractive power. The sixth lens is with refractive power. The seventh lens is with positive refractive power and includes a convex surface facing the image side. The eighth lens is with refractive power and includes a convex surface facing the object side. The first lens, the second lens, the third lens, the fourth lens, the fifth lens, the sixth lens, the seventh lens, and the eighth lens are arranged in order from the object side to the image side along an optical axis. The first lens, the second lens, the third lens, the fourth lens, the fifth lens, the sixth lens, the seventh lens, and the eighth lens are spaced apart with air gaps formed therebetween.

Referring to Table 1, Table 2, Table 4, Table 5, Table 7, Table 8, Table 10, Table 11, Table 13, Table 14, Table 16, Table 17, Table 19, and Table 20, wherein Table 1, Table 4, Table 7, Table 10, Table 13, Table 16, and Table 19 show optical specification in accordance with a first, a second, a third, a fourth, a fifth, a sixth, and a seventh embodiments of the invention, respectively and Table 2, Table 5, Table 8, Table 11, Table 14, Table 17, and Table 20 show aspheric coefficients of each aspheric lens in Table 1, Table 4, Table 7, Table 10, Table 13, Table 16, and Table 19, respectively. The aspheric surface sag z of each aspheric lens in the following embodiments can be calculated by the following formula: $z=ch^2/\{1+[1-(k+1)c^2h^2]^{1/2}\}+Ah^4+Bh^6+Ch^8+Dh^{10}+Eh^{12}$, where c is curvature, h is the vertical distance from the lens surface to the optical axis, k is conic constant, A, B, C, D, and E are aspheric coefficients, and the value of the aspheric coefficient A, B, C, D, and E are presented in scientific notation, such as 2E-03 for $2\times10^3$.

FIGS. 1, 2, 3, 4, 5, 9, and 13 are lens layout and optical path diagrams of the lens assemblies in accordance with the first, second, third, fourth, fifth, sixth, and seventh embodiments of the invention, respectively.

The first lenses L11, L21, L31, L41, L51, L61, L71 are meniscus lenses with negative refractive power and made of glass material, wherein the object side surfaces S11, S21, S31, S41, S51, S61, S71 are convex surfaces, the image side surfaces S12, S22, S32, S42, S52, S62, S72 are concave surfaces.

The second lenses L12, L22, L32, L42, L52, L62, L72 are meniscus lenses with negative refractive power and made of glass material, wherein the object side surfaces S13, S23, S33, S43, S53, S63, S73 are concave surfaces, the image side surfaces S14, S24, S34, S44, S54, S64, S74 are convex surfaces.

The third lenses L13, L23, L33, L43, L53, L63, L73 are biconvex lenses with positive refractive power and made of plastic material, wherein the object side surfaces S15, S25, S35, S45, S55, S65, S75 are convex surfaces, the image side surfaces S16, S26, S36, S46, S56, S66, S76 are convex surfaces, and both of the object side surfaces S15, S25, S35, S45, S55, S65, S75 and image side surfaces S16, S26, S36, S46, S56, S66, S76 are aspheric surfaces.

The fourth lenses L14, L24, L34, L44, L54, L64, L74 are biconvex lenses with positive refractive power and made of plastic material, wherein the object side surfaces S18, S28, S38, S48, S58, S68, S78 are convex surfaces, the image side surfaces S19 S29, S39, S49, S59, S69, S79 are convex surfaces, and both of the object side surfaces S18, S28, S38, S48, S58, S68, S78 and image side surfaces S19 S29, S39, S49, S59, S69, S79 are aspheric surfaces.

The fifth lenses L15, L25, L35, L45, L55, L65, L75 are with negative refractive power and made of glass material, wherein the object side surfaces S110, S210, S310, S410, S510, S610, S710 are concave surfaces.

The sixth lenses L16, L26, L36, L46, L56, L66, L76 are meniscus lenses and made of plastic material, wherein the object side surfaces S112, S212, S312, S412, S512, S612, S712 are convex surfaces, the image side surfaces S113 S213, S313, S413, S513, S613, S713 are concave surfaces, and both of the object side surfaces S112, S212, S312, S412, S512, S612, S712 and image side surfaces S113 S213, S313, S413, S513, S613, S713 are aspheric surfaces.

The seventh lenses L17, L27, L37, L47, L57, L67, L77 are with positive refractive power and made of plastic material, wherein the image side surfaces S115, S215, S315, S415, S515, S615, S715 are convex surfaces, and both of the object side surfaces S114, S214, S314, S414, S514, S614, S714 and image side surfaces S115, S215, S315, S415, S515, S615, S715 are aspheric surfaces.

The eighth lenses L18, L28, L38, L48, L58, L68, L78 are meniscus lenses and made of plastic material, wherein the object side surfaces S116, S216, S316, S416, S516, S616, S716 are convex surfaces, the image side surfaces S117 S217, S317, S417, S517, S617, S717 are concave surfaces, and both of the object side surfaces S116, S216, S316, S416, S516, S616, S716 and image side surfaces S117 S217, S317, S417, S517, S617, S717 are aspheric surfaces.

In addition, the lens assemblies 1, 2, 3, 4, 5, 6, and 7 satisfy at least one of the following conditions (1)-(9):

$$-14<f2/f<0; \quad (1)$$

$$2.5\leq TTL/f\leq 4.5; \quad (2)$$

$$-11<(R21+R22)/(R21-R22)<0; \quad (3)$$

$$1\leq f123/f\leq 3.2; \quad (4)$$

$$8.5\text{ degrees/mm}\leq\theta/TTL\leq 10\text{ degrees/mm}; \quad (5)$$

$$-10.99 \le (R21+R22)/CT2 \le -7.04; \quad (6)$$

$$39.16 \le (R61+R62)/CT6 \le 109.93; \quad (7)$$

$$14.22 \le TTL/T34 \le 27.12; \quad (8)$$

$$46.71 \le TTL/T67 \le 92.54; \quad (9)$$

wherein: f is an effective focal length of the wide-angle lens assemblies 1, 2, 3, 4, 5, 6, 7 for the first to seventh embodiments; f2 is an effective focal length of the second lenses L12, L22, L32, L42, L52, L62, L72 for the first to seventh embodiments; TTL is an interval from the object side surfaces S11, S21, S31, S41, S51, S61, S71 of the first lenses L11, L21, L31, L41, L51, L61, L71 to the image planes IMA1, IMA2, IMA3, IMA4, IMA5, IMA6, IMA7 along the optical axes OA1, OA2, OA3, OA4, OA5, OA6, OA7 for the first to seventh embodiments; R21 is a radius of curvature of the object side surfaces S13, S23, S33, S43, S53, S63, S73 of the second lenses L12, L22, L32, L42, L52, L62, L72 for the first to seventh embodiments; R22 is a radius of curvature of the image side surfaces S14, S24, S34, S44, S54, S64, S74 of the second lenses L12, L22, L32, L42, L52, L62, L72 for the first to seventh embodiments; R61 is a radius of curvature of the object side surfaces S112, S212, S312, S412, S512, S612, S712 of the sixth lenses L16, L26, L36, L46, L56, L66, L76 for the first to seventh embodiments; R62 is a radius of curvature of the image side surfaces S113, S213, S313, S413, S513, S613, S713 of the sixth lenses L16, L26, L36, L46, L56, L66, L76 for the first to seventh embodiments; f123 is an effective focal length of the combination of the first lenses L11, L21, L31, L41, L51, L61, L71, the second lenses L12, L22, L32, L42, L52, L62, L72, the third lenses L13, L23, L33, L43, L53, L63, L73 for the first to seventh embodiments; θ is a half field of view of the wide-angle lens assemblies 1, 2, 3, 4, 5, 6, 7 for the first to seventh embodiments; CT2 is an interval from the object side surfaces S13, S23, S33, S43, S53, S63, S73 of the second lenses L12, L22, L32, L42, L52, L62, L72 to the image side surfaces S14, S24, S34, S44, S54, S64, S74 of the second lenses L12, L22, L32, L42, L52, L62, L72 along the optical axes OA1, OA2, OA3, OA4, OA5, OA6, OA7 for the first to seventh embodiments; CT6 is an interval from the object side surfaces S112, S212, S312, S412, S512, S612, S712 of the sixth lenses L16, L26, L36, L46, L56, L66, L76 to the image side surfaces S113, S213, S313, S413, S513, S613, S713 of the sixth lenses L16, L26, L36, L46, L56, L66, L76 along the optical axes OA1, OA2, OA3, OA4, OA5, OA6, OA7 for the first to seventh embodiments; Td34 is an interval from the image side surfaces S16, S26, S36, S46, S56, S66, S76 of the third lenses L13, L23, L33, L43, L53, L63, L73 to the object side surfaces S18, S28, S38, S48, S58, S68, S78 of the fourth lenses L14, L24, L34, L44, L54, L64, L74 along the optical axes OA1, OA2, OA3, OA4, OA5, OA6, OA7 for the first to seventh embodiments; Td67 is an interval from the image side surfaces S113, S213, S313, S413, S513, S613, S713 of the sixth lenses L16, L26, L36, L46, L56, L66, L76 to the object side surfaces S114, S214, S314, S414, S514, S614, S714 of the seventh lenses L17, L27, L37, L47, L57, L67, L77 along the optical axes OA1, OA2, OA3, OA4, OA5, OA6, OA7 for the first to seventh embodiments. With the wide-angle lens assemblies 1, 2, 3, 4, 5, 6, 7 satisfying at least one of the above conditions (1)-(9), the total lens length can be effectively decreased, the field of view can be effectively increased, and the aberration can be effectively corrected.

When the condition (1): $-14<f2/f<0$ is satisfied, the distortion caused by the large light collection angle of the first lens can be effectively decreased and the aberration can be effectively decreased. When the condition (2): $2.5 \le TTL/f \le 4.5$ is satisfied, the total lens length can be effectively decreased and a more appropriate back focal length can be obtained. When the condition (3): $-11 \le (R21+R22)/(R21-R22) \le 0$ is satisfied, the shape of the second lens can be effectively controlled. When the condition (4): $1 \le f123/f \le 3.2$ is satisfied, the effective focal length of the combination of the first lens, the second lens, and the third lens can be effectively controlled and various types of aberrations can be effectively decreased. When the condition (5): 8.5 degrees/mm$\le \theta/TTL \le$10 degrees/mm is satisfied, the total lens length can be effectively decreased and the distortion and aberration can be effectively decreased to improve image quality. When the condition (6): $-10.99 \le (R21+R22)/CT2 \le -7.04$ is satisfied, the manufacturing yield of the second lens can be effectively increased. When the condition (7): $39.16 \le (R61+R62)/CT6 \le 109.93$ is satisfied, the manufacturing yield of the sixth lens can be effectively increased. When the condition (8): $14.22 \le TTL/T34 \le 27.12$ is satisfied, the distortion can be effectively dereased. When the condition (9): $46.71 \le TTL/T67 \le 92.54$ is satisfied, the sensitivity during lens assembly process can be effectively decreased to improve the assembly yield for the wide-angle lens assembly. When the conditions (2) and (5): $2.5 \le TTL/f \le 4.5$; 8.5 degrees/mm$\le O/TTL \le$10 degrees/mm are satisfied, the total lens length can be effectively decreased and the image quality is better. The field of view can be effectively increased and the optical path can be effectively adjusted to prevent big bend in the light path when the first lens is a meniscus lens with negative refractive power. The optical path adjustment caused by the negative refractive power of the first lens can be effectively slowed to correct partial aberration when the second lens is a meniscus lens with negative refractive power. The aberration caused by the first lens and the second lens are with negative refractive power can be effectively corrected when the third lens is with positive refractive power. The lack of positive refractive power of the third lens can be make up to correct aberration when the fourth lens is with positive refractive power. Aberration caused by the sixth lens, seventh lens, and eighth lens being plastic lenses due to environment temperature change can be corrected when the fifth lens is with negative refractive power. The chief ray angle can be greatly adjusted and the back focal length can be increased which are beneficial for the assembly of the wide-angle lens assembly when the sixth, seventh, and eighth lenses are plastic aspheric lenses.

A detailed description of a wide-angle lens assembly in accordance with a first embodiment of the invention is as follows. Referring to FIG. 1, the wide-angle lens assembly 1 includes a first lens L11, a second lens L12, a third lens L13, a stop ST1, a fourth lens L14, a fifth lens L15, a sixth lens L16, a seventh lens L17, an eighth lens L18, and an optical filter OF1, all of which are arranged in order from an object side to an image side along an optical axis OA1. In operation, the light from the object side is imaged on an image plane IMA1.

According to the foregoing, wherein: both of the object side surface S11 and image side surface S12 of the first lens L11 are spherical surfaces; both of the object side surface S13 and image side surface S14 of the second lens L12 are aspheric surfaces; the fifth lens L15 is a meniscus lens, wherein the image side surface S111 is a convex surface and both of the object side surface S110 and image side surface S111 are aspheric surfaces; the sixth lens L16 is with negative refractive power; the seventh lens L17 is a biconvex lens, wherein the object side surface S114 is a convex surface; the eighth lens L18 is with negative refractive power; and both of object side surface S118 and image side surface S119 of the optical filter OF1 are plane surfaces; with the above design of the lenses, stop ST1, and at least one of the conditions (1)-(9) satisfied, the wide-angle lens assembly 1 can have an effective decreased total lens length, an effective increased field of view, and an effective corrected aberration. The wide-angle lens assembly of the present invention can meet the basic operation requirements when it only satisfies condition (1) and the refractive surface shape characteristics of the independent claim, or only satisfies condition (4) and the refractive surface shape characteristics of the independent claim.

Table 1 shows the optical specification of the wide-angle lens assembly 1 in FIG. 1.

TABLE 1

| Effective Focal Length = 2.78 mm | | | F-number = 2.30 | | | |
|---|---|---|---|---|---|---|
| Total Lens Length = 7.96 mm | | | Half Field of View = 78.10 degrees | | | |
| Surface Number | Radius of Curvature (mm) | Thickness (mm) | Nd | Vd | Effective Focal Length (mm) | Remark |
| S11 | 128.59 | 0.40 | 1.71 | 53.8 | −4.54 | L11 |
| S12 | 3.17 | 1.06 | | | | |
| S13 | −1.92 | 0.56 | 1.59 | 59.6 | −29.75 | L12 |
| S14 | −2.39 | 0.06 | | | | |
| S15 | 2.01 | 1.19 | 1.59 | 59.6 | 3.01 | L13 |
| S16 | −11.66 | −0.06 | | | | |
| S17 | ∞ | 0.36 | | | | ST1 |
| S18 | 10.59 | 0.71 | 1.59 | 59.6 | 5.43 | L14 |
| S19 | −3.37 | 0.09 | | | | |
| S110 | −2.53 | 0.29 | 1.66 | 20.4 | −4.40 | L15 |
| S111 | −18.02 | 0.05 | | | | |
| S112 | 9.21 | 0.30 | 1.54 | 56.1 | −10.52 | L16 |
| S113 | 3.47 | 0.09 | | | | |
| S114 | 28.73 | 0.57 | 1.54 | 56.1 | 2.33 | L17 |
| S115 | −1.30 | 0.20 | | | | |
| S116 | 3.08 | 0.30 | 1.54 | 56.1 | −2.97 | L18 |
| S117 | 1.02 | 0.28 | | | | |
| S118 | ∞ | 0.30 | 1.52 | 64.2 | | OF1 |
| S119 | ∞ | 1.20 | | | | |

In the first embodiment, the conic constant k and the aspheric coefficients A, B, C, D, E of each aspheric lens are shown in Table 2.

TABLE 2

| Surface Number | k | A | B | C | D | E |
|---|---|---|---|---|---|---|
| S13 | −3.0188 | −0.0055 | 0.0052 | 0.0009 | −0.0002 | −3.7E−05 |
| S14 | −1.2855 | 0.0298 | −0.0025 | 0.0046 | −0.0009 | 0.0002 |
| S15 | 0 | −0.0166 | −0.0071 | 0 | 0 | 0 |
| S16 | 0 | −0.0732 | 0.0191 | 0 | 0 | 0 |
| S18 | 15.9093 | −0.0838 | −0.0071 | 0.0241 | −0.0087 | 0.0024 |
| S19 | −11.1028 | −0.0598 | −0.0188 | 0.0218 | −0.0423 | 0.0165 |
| S110 | −8.0844 | −0.0232 | −0.0051 | −0.0255 | −0.0055 | 0.0002 |
| S111 | 66.0007 | 0.0754 | −0.0890 | 0.0500 | −0.0090 | −6.4E−05 |
| S112 | 3.26826 | −0.0335 | −0.0139 | 0.0245 | −0.0057 | −1.5E−06 |
| S113 | −29.7654 | 0.0278 | −0.1118 | 0.0562 | −0.0071 | −0.0004 |
| S114 | −8.6182 | 0.1473 | −0.1795 | 0.0862 | −0.0180 | 0.0012 |
| S115 | −7.6096 | 0.0584 | −0.0003 | −0.0003 | −0.0007 | 8.81E−05 |
| S116 | −3.8123 | −0.1358 | 0.0313 | −0.0012 | −0.0001 | −2E−05 |
| S117 | −5.8565 | −0.0882 | 0.0282 | −0.0066 | 0.0009 | −5.3E−05 |

Table 3 shows the parameters and condition values for conditions (1)-(9) in accordance with the first embodiment of the invention. It can be seen from Table 3 that the wide-angle lens assembly 1 of the first embodiment satisfies the conditions (1)-(9).

TABLE 3

| | | | | | |
|---|---|---|---|---|---|
| f123 | 3.99 mm | θ | 78.10 degrees | CT2 | 0.56 mm |
| CT6 | 0.30 mm | T34 | 0.30 mm | T67 | 0.09 mm |
| f2/f | −10.71 | TTL/f | 2.86 | (R21 + R22)/(R21 − R22) | −9.19 |
| f123/f | 1.44 | θ/TTL | 9.81 degrees/mm | (R21 + R22)/CT2 | −7.71 |
| (R61 + R62)/CT6 | 42.39 | TTL/T34 | 26.18 | TTL/T67 | 90.43 |

Figure 2:
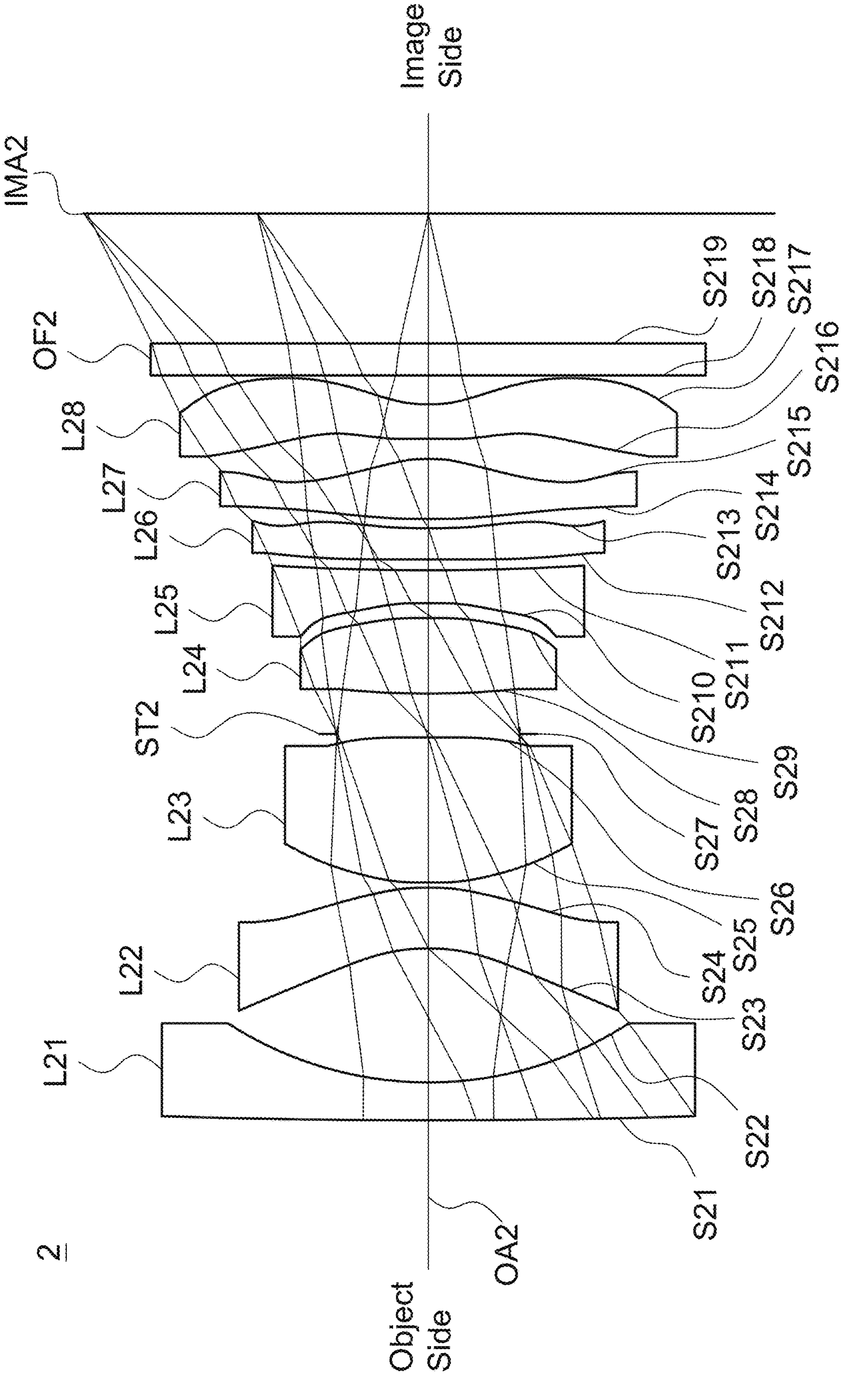

A detailed description of a wide-angle lens assembly in accordance with a second embodiment of the invention is as follows. Referring to FIG. 2, the wide-angle lens assembly 2 includes a first lens L21, a second lens L22, a third lens L23, a stop ST2, a fourth lens L24, a fifth lens L25, a sixth lens L26, a seventh lens L27, an eighth lens L28, and an optical filter OF2, all of which are arranged in order from an object side to an image side along an optical axis OA2. In operation, the light from the object side is imaged on an image plane IMA2.

According to the foregoing, wherein: both of the object side surface S21 and image side surface S22 of the first lens L21 are spherical surfaces; both of the object side surface S23 and image side surface S24 of the second lens L22 are aspheric surfaces; the fifth lens L25 is a meniscus lens, wherein the image side surface S211 is a convex surface and both of the object side surface S210 and image side surface S211 are aspheric surfaces; the sixth lens L26 is with negative refractive power; the seventh lens L27 is a biconvex lens, wherein the object side surface S214 is a convex surface; the eighth lens L28 is with negative refractive power; and both of object side surface S218 and image side surface S219 of the optical filter OF2 are plane surfaces; with the above design of the lenses, stop ST2, and at least one of the conditions (1)-(9) satisfied, the wide-angle lens assembly 2 can have an effective decreased total lens length, an effective increased field of view, and an effective corrected aberration. The wide-angle lens assembly of the present invention can meet the basic operation requirements when it only satisfies condition (2) and the refractive surface shape characteristics of the independent claim.

Table 4 shows the optical specification of the wide-angle lens assembly 2 in FIG. 2.

TABLE 4

Effective Focal Length = 2.78 mm F-number = 2.30
Total Lens Length = 8.46 mm Half Field of View = 77.70 degrees

| Surface Number | Radius of Curvature (mm) | Thickness (mm) | Nd | Vd | Effective Focal Length (mm) | Remark |
|---|---|---|---|---|---|---|
| S21 | 104.37 | 0.35 | 1.71 | 53.8 | −5.06 | L21 |
| S22 | 3.50 | 1.23 | | | | |
| S23 | −1.75 | 0.57 | 1.59 | 59.6 | −18.35 | L22 |
| S24 | −2.35 | 0.05 | | | | |
| S25 | 2.22 | 1.36 | 1.59 | 59.6 | 3.34 | L23 |
| S26 | −13.49 | 0.03 | | | | |
| S27 | ∞ | 0.38 | | | | ST2 |
| S28 | 6.13 | 0.71 | 1.59 | 59.6 | 4.30 | L24 |
| S29 | −4.14 | 0.15 | | | | |
| S210 | −3.02 | 0.31 | 1.66 | 20.4 | −4.73 | L25 |
| S211 | −58.20 | 0.09 | | | | |
| S212 | 11.96 | 0.30 | 1.54 | 56.1 | −11.46 | L26 |
| S213 | 4.04 | 0.10 | | | | |
| S214 | 50.12 | 0.55 | 1.54 | 56.1 | 2.4 | L27 |
| S215 | −1.33 | 0.18 | | | | |
| S216 | 3.00 | 0.32 | 1.54 | 56.1 | −3.2 | L28 |
| S217 | 1.05 | 0.28 | | | | |
| S218 | ∞ | 0.30 | 1.52 | 64.2 | | OF2 |
| S219 | ∞ | 1.22 | | | | |

In the second embodiment, the conic constant k and the aspheric coefficients A, B, C, D, E of each aspheric lens are shown in Table 5.

TABLE 5

| Surface Number | k | A | B | C | D | E |
|---|---|---|---|---|---|---|
| S23 | −3.4690 | −0.0044 | 0.0038 | 0.0003 | −0.0002 | 1.46E−05 |
| S24 | −1.4324 | 0.0315 | −0.0044 | 0.0032 | −0.0008 | 8.34E−05 |
| S25 | −0.1620 | −0.0235 | −0.0024 | 0.0042 | −0.0034 | 0.0009 |
| S26 | −220.7050 | −0.0647 | 0.0270 | −0.0031 | −0.0090 | 0.0061 |
| S28 | 15.8672 | −0.0616 | 0.0131 | −0.0083 | 0.0156 | −0.0119 |
| S29 | −6.0188 | −0.0443 | 0.0184 | 0.0318 | −0.0561 | 0.0124 |
| S210 | −5.0191 | −0.0077 | 0.0224 | −0.0180 | −0.0033 | −0.0077 |
| S211 | 33.0459 | 0.0792 | −0.0823 | 0.0473 | −0.0134 | 0.0012 |
| S212 | 24.1682 | −0.0115 | −0.0234 | 0.0225 | −0.0050 | 5.87E−05 |
| S213 | −30.8673 | 0.0288 | −0.1142 | 0.0567 | −0.0068 | −0.0003 |
| S214 | 29.8172 | 0.1570 | −0.1803 | 0.0853 | −0.0180 | 0.0014 |
| S215 | −7.2472 | 0.0494 | 0.0013 | 9.27E−05 | −0.0007 | 7.51E−05 |
| S216 | −4.8493 | −0.1316 | 0.0321 | −0.0015 | −0.0002 | −4.4E−06 |
| S217 | −5.9813 | −0.0853 | 0.0273 | −0.0065 | 0.0009 | −5.1E−05 |

Table 6 shows the parameters and condition values for conditions (1)-(9) in accordance with the second embodiment of the invention. It can be seen from Table 6 that the wide-angle lens assembly 2 of the second embodiment satisfies the conditions (1)-(9).

TABLE 6

| | | | | | |
|---|---|---|---|---|---|
| f123 | 4.91 mm | θ | 77.70 degrees | CT2 | 0.57 mm |
| CT6 | 0.30 mm | T34 | 0.41 mm | T67 | 0.10 mm |
| f2/f | −6.59 | TTL/f | 3.04 | (R21 + R22)/(R21 − R22) | −6.94 |
| f123/f | 1.76 | θ/TTL | 9.19 degrees/mm | (R21 + R22)/CT2 | −7.22 |
| (R61 + R62)/CT6 | 53.33 | TTL/T34 | 20.83 | TTL/T67 | 82.91 |

Figure 3:
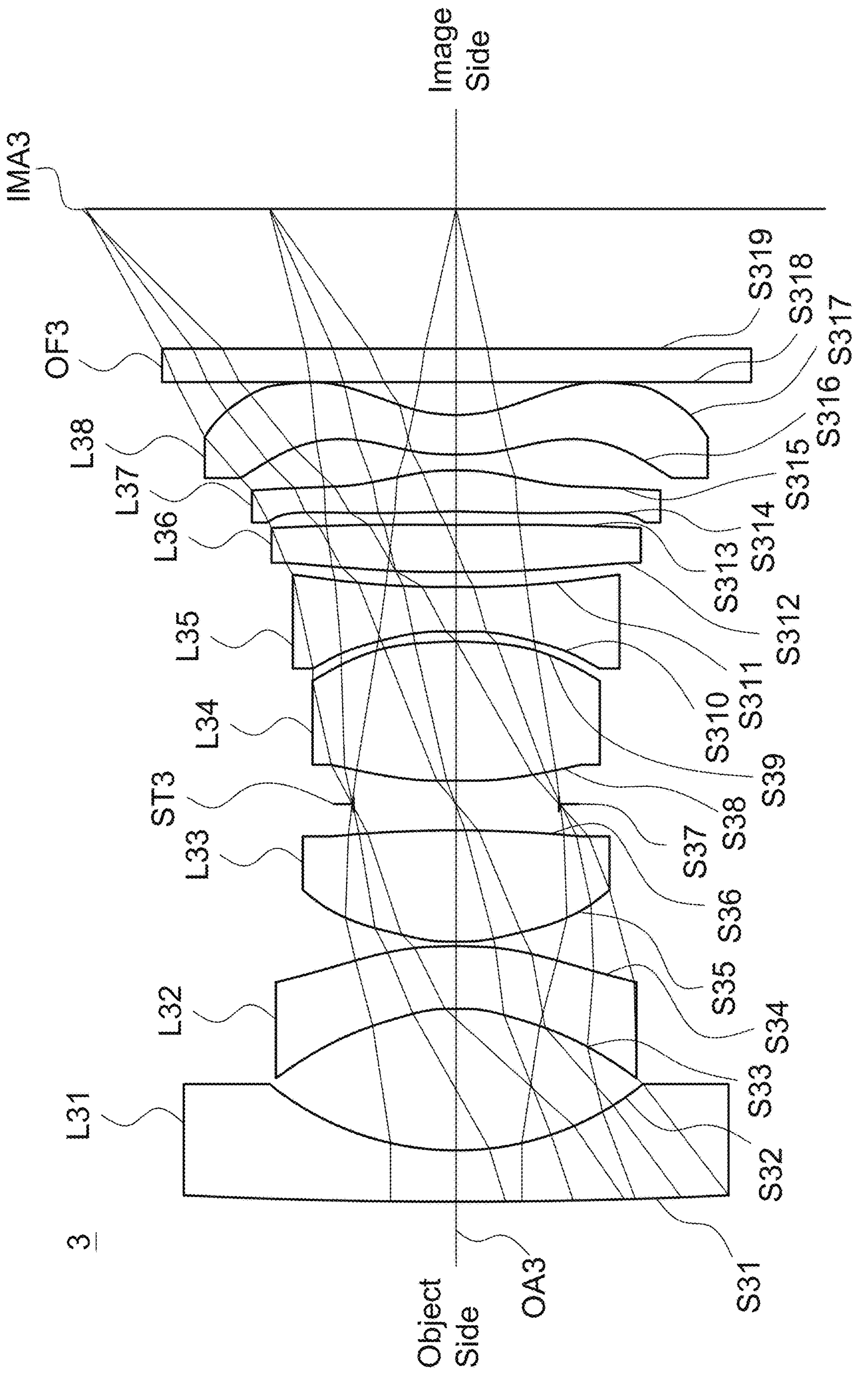

A detailed description of a wide-angle lens assembly in accordance with a third embodiment of the invention is as follows. Referring to FIG. 3, the wide-angle lens assembly 3 includes a first lens L31, a second lens L32, a third lens L33, a stop ST3, a fourth lens L34, a fifth lens L35, a sixth lens L36, a seventh lens L37, an eighth lens L38, and an optical filter OF3, all of which are arranged in order from an object side to an image side along an optical axis OA3. In operation, the light from the object side is imaged on an image plane IMA3.

According to the foregoing, wherein: both of the object side surface S31 and image side surface S32 of the first lens L31 are spherical surfaces; both of the object side surface S33 and image side surface S34 of the second lens L32 are aspheric surfaces; the fifth lens L35 is a biconcave lens, wherein the image side surface S311 is a concave surface and both of the object side surface S310 and image side surface S311 are spherical surfaces; the sixth lens L36 is with positive refractive power; the seventh lens L37 is a meniscus lens, wherein the object side surface S314 is a concave surface; the eighth lens L38 is with negative refractive power; and both of object side surface S318 and image side surface S319 of the optical filter OF3 are plane surfaces; with the above design of the lenses, stop ST3, and at least one of the conditions (1)-(9) satisfied, the wide-angle lens assembly 3 can have an effective decreased total lens length, an effective increased field of view, and an effective corrected aberration. The wide-angle lens assembly of the present invention can meet the basic operation requirements when it only satisfies condition (3) and the refractive surface shape characteristics of the independent claim, or only satisfies condition (6) and the refractive surface shape characteristics of the independent claim.

Table 7 shows the optical specification of the wide-angle lens assembly 3 in FIG. 3.

TABLE 7

Effective Focal Length = 2.62 mm F-number = 2.30
Total Lens Length = 8.54 mm Half Field of View = 82.27 degrees

| Surface Number | Radius of Curvature (mm) | Thickness (mm) | Nd | Vd | Effective Focal Length (mm) | Remark |
|---|---|---|---|---|---|---|
| S31 | 47.19 | 0.44 | 1.71 | 53.8 | −3.82 | L31 |
| S32 | 2.58 | 1.22 | | | | |
| S33 | −1.70 | 0.54 | 1.65 | 39.7 | −10.41 | L32 |
| S34 | −2.55 | 0.04 | | | | |

TABLE 7-continued

| | | | | | | |
|---|---|---|---|---|---|---|
| S35 | 2.11 | 0.96 | 1.59 | 59.6 | 3.23 | L33 |
| S36 | −16.33 | 0.22 | | | | |
| S37 | ∞ | 0.19 | | | | ST3 |
| S38 | 2.96 | 1.22 | 1.59 | 59.6 | 2.58 | L34 |
| S39 | −2.65 | 0.07 | | | | |
| S310 | −2.64 | 0.40 | 1.85 | 23.8 | −2.42 | L35 |
| S311 | 10.59 | 0.12 | | | | |
| S312 | 8.01 | 0.40 | 1.54 | 56.1 | 19.28 | L36 |
| S313 | 34.36 | 0.12 | | | | |
| S314 | −5.04 | 0.35 | 1.54 | 56.1 | 5.43 | L37 |
| S315 | −1.90 | 0.14 | | | | |
| S316 | 1.53 | 0.34 | 1.54 | 56.1 | −7.45 | L38 |
| S317 | 1.02 | 0.27 | | | | |
| S318 | ∞ | 0.30 | 1.52 | 64.2 | | OF3 |
| S319 | ∞ | 1.20 | | | | |

In the third embodiment, the conic constant k and the aspheric coefficients A, B, C, D, E of each aspheric lens are shown in Table 8.

TABLE 8

| Surface Number | k | A | B | C | D | E |
|---|---|---|---|---|---|---|
| S33 | −2.1670 | −0.0007 | 0.0040 | −0.0014 | 0 | 0 |
| S34 | −1.2106 | 0.0300 | 0.0018 | −0.0017 | 0 | 0 |
| S35 | 0.4545 | −0.0162 | 0.0034 | −0.0035 | 0 | 0 |
| S36 | −52.4239 | −0.0321 | 0.0291 | −0.0158 | 0.0047 | −0.0003 |
| S38 | 2.9561 | −0.0510 | 0.0090 | −0.0186 | 0.0106 | −0.0052 |
| S39 | −2.2212 | −0.0281 | −0.0126 | 0.0197 | −0.0117 | 0.0020 |
| S312 | −87.5806 | −0.0035 | −0.0136 | 0.0126 | −0.0017 | −0.0006 |
| S313 | 74.1803 | 0.0453 | −0.1027 | 0.0596 | −0.0120 | 0.0004 |
| S314 | −190.7480 | 0.1369 | −0.1501 | 0.0796 | −0.0225 | 0.0025 |
| S315 | −14.6404 | 0.0395 | −0.0072 | 0.0043 | −0.0028 | 0.0005 |
| S316 | −6.6181 | −0.1224 | 0.0265 | −0.0036 | −0.0003 | 0.0002 |
| S317 | −4.7010 | −0.0953 | 0.0292 | −0.0078 | 0.0012 | −8.4E−05 |

Table 9 shows the parameters and condition values for conditions (1)-(9) in accordance with the third embodiment of the invention. It can be seen from Table 9 that the wide-angle lens assembly 3 of the third embodiment satisfies the conditions (1)-(9).

TABLE 9

| | | | | | |
|---|---|---|---|---|---|
| f123 | 7.61 mm | θ | 82.27 degrees | CT2 | 0.54 mm |
| CT6 | 0.40 mm | T34 | 0.41 mm | T67 | 0.12 mm |
| f2/f | −3.98 | TTL/f | 3.26 | (R21 + R22)/(R21 − R22) | −5.00 |
| f123/f | 2.91 | θ/TTL | 9.64 degrees/mm | (R21 + R22)/CT2 | −7.81 |
| (R61 + R62)/CT6 | 106.71 | TTL/T34 | 20.62 | TTL/T67 | 71.13 |

Figure 4:
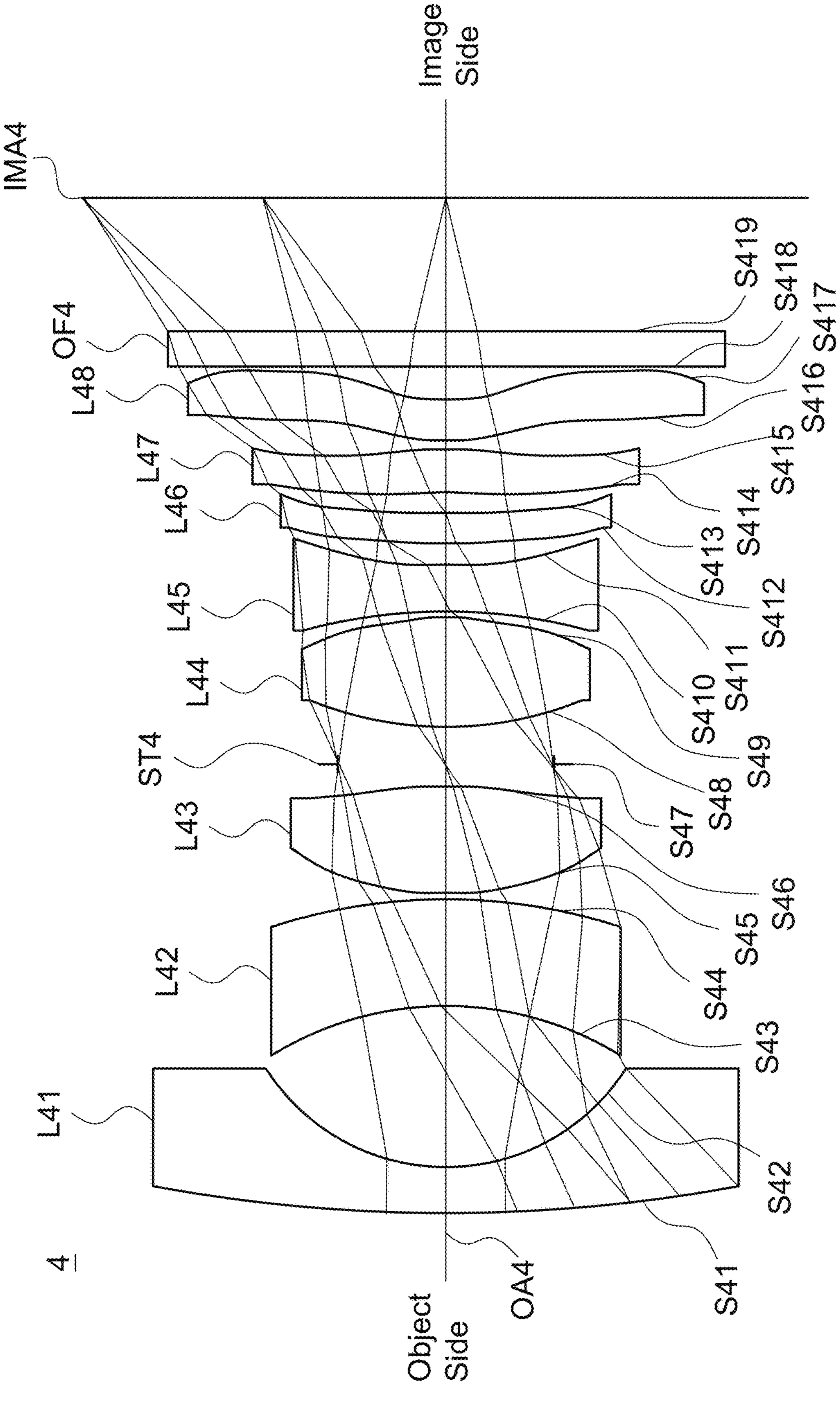

A detailed description of a wide-angle lens assembly in accordance with a fourth embodiment of the invention is as follows. Referring to FIG. 4, the wide-angle lens assembly 4 includes a first lens L41, a second lens L42, a third lens L43, a stop ST4, a fourth lens L44, a fifth lens L45, a sixth lens L46, a seventh lens L47, an eighth lens L48, and an optical filter OF4, all of which are arranged in order from an object side to an image side along an optical axis OA4. In operation, the light from the object side is imaged on an image plane IMA4.

According to the foregoing, wherein: both of the object side surface S41 and image side surface S42 of the first lens L41 are aspheric surfaces; both of the object side surface S43 and image side surface S44 of the second lens L42 are spherical surfaces; the fifth lens L45 is a biconcave lens, wherein the image side surface S411 is a concave surface and both of the object side surface S410 and image side surface S411 are spherical surfaces; the sixth lens L46 is with positive refractive power; the seventh lens L47 is a meniscus lens, wherein the object side surface S414 is a concave surface; the eighth lens L48 is with negative refractive power; and both of object side surface S418 and image side surface S419 of the optical filter OF4 are plane surfaces; with the above design of the lenses, stop ST4, and at least one of the conditions (1)-(9) satisfied, the wide-angle lens assembly 4 can have an effective decreased total lens length, an effective increased field of view, and an effective corrected aberration. The wide-angle lens assembly of the present invention can meet the basic operation requirements when it only satisfies condition (5) and the refractive surface shape characteristics of the independent claim.

Table 10 shows the optical specification of the wide-angle lens assembly 4 in FIG. 4.

TABLE 10

Effective Focal Length = 2.40 mm F-number = 2.30
Total Lens Length = 8.98 mm Half Field of View = 83.08 degrees

| Surface Number | Radius of Curvature (mm) | Thickness (mm) | Nd | Vd | Effective Focal Length (mm) | Remark |
|---|---|---|---|---|---|---|
| S41 | 11.83 | 0.42 | 1.74 | 49.3 | −3.38 | L41 |
| S42 | 2.06 | 1.42 | | | | |
| S43 | −2.77 | 0.94 | 1.69 | 56.3 | −11.57 | L42 |
| S44 | −4.80 | 0.05 | | | | |
| S45 | 2.60 | 0.94 | 1.59 | 59.6 | 3.12 | L43 |
| S46 | −5.47 | 0.21 | | | | |
| S47 | ∞ | 0.34 | | | | ST4 |
| S48 | 2.86 | 0.96 | 1.59 | 59.6 | 2.61 | L44 |
| S49 | −2.91 | 0.06 | | | | |
| S410 | −4.70 | 0.40 | 1.85 | 23.8 | −2.33 | L45 |
| S411 | 3.63 | 0.20 | | | | |
| S412 | 4.26 | 0.28 | 1.54 | 56.1 | 16.79 | L46 |
| S413 | 7.86 | 0.18 | | | | |
| S414 | −4.31 | 0.37 | 1.54 | 56.1 | 26.15 | L47 |
| S415 | −3.40 | 0.08 | | | | |
| S416 | 1.46 | 0.36 | 1.54 | 56.1 | −46.23 | L48 |
| S417 | 1.26 | 0.30 | | | | |
| S418 | ∞ | 0.30 | 1.52 | 64.2 | | OF4 |
| S419 | ∞ | 1.19 | | | | |

In the fourth embodiment, the conic constant k and the aspheric coefficients A, B, C, D, E of each aspheric lens are shown in Table 11.

TABLE 11

| Surface Number | k | A | B | C | D | E |
|---|---|---|---|---|---|---|
| S41 | 0.7631 | 0.0002 | −0.0004 | 3.59E−05 | 0 | 0 |
| S42 | −0.0590 | 0.0107 | 0.0018 | 0.0008 | 0 | 0 |
| S45 | −0.0095 | 0.0030 | 0.0004 | −4.4E−05 | 0 | 0 |
| S46 | −15.4012 | 0.0044 | 0.0015 | 7.13E−05 | 0 | 0 |
| S48 | 1.9114 | −0.0118 | −0.0085 | −0.0025 | 0.0005 | −0.0012 |
| S49 | −4.1699 | −0.0120 | 0.0021 | 0.0010 | −0.0041 | 0.0009 |
| S412 | −6.8878 | −0.0461 | −0.0146 | 0.0192 | 0.0003 | −0.0011 |
| S413 | 14.2473 | 0.0216 | −0.0918 | 0.0617 | −0.0108 | −1.3E−05 |
| S414 | −146.5950 | 0.1456 | −0.1423 | 0.0791 | −0.0239 | 0.0030 |
| S415 | −54.2908 | 0.0298 | −0.0066 | 0.0064 | −0.0030 | 0.0004 |
| S416 | −6.5762 | −0.1047 | 0.0331 | −0.0030 | −0.0002 | 3.44E−05 |
| S417 | −5.4534 | −0.0842 | 0.0283 | −0.0062 | 0.0008 | −5.5E−05 |

Table 12 shows the parameters and condition values for conditions (1)-(9) in accordance with the fourth embodiment of the invention. It can be seen from Table 12 that the wide-angle lens assembly 4 of the fourth embodiment satisfies the conditions (1)-(9).

TABLE 12

| | | | | | |
|---|---|---|---|---|---|
| f123 | 4.93 mm | θ | 83.08 degrees | CT2 | 0.94 mm |
| CT6 | 0.28 mm | T34 | 0.54 mm | T67 | 0.18 mm |
| f2/f | −4.81 | TTL/f | 3.74 | (R21 + R22)/(R21 − R22) | −3.73 |
| f123/f | 2.05 | θ/TTL | 9.25 degrees/mm | (R21 + R22)/CT2 | −8.05 |
| (R61 + R62)/CT6 | 44.08 | TTL/T34 | 16.54 | TTL/T67 | 48.82 |

Figure 5:
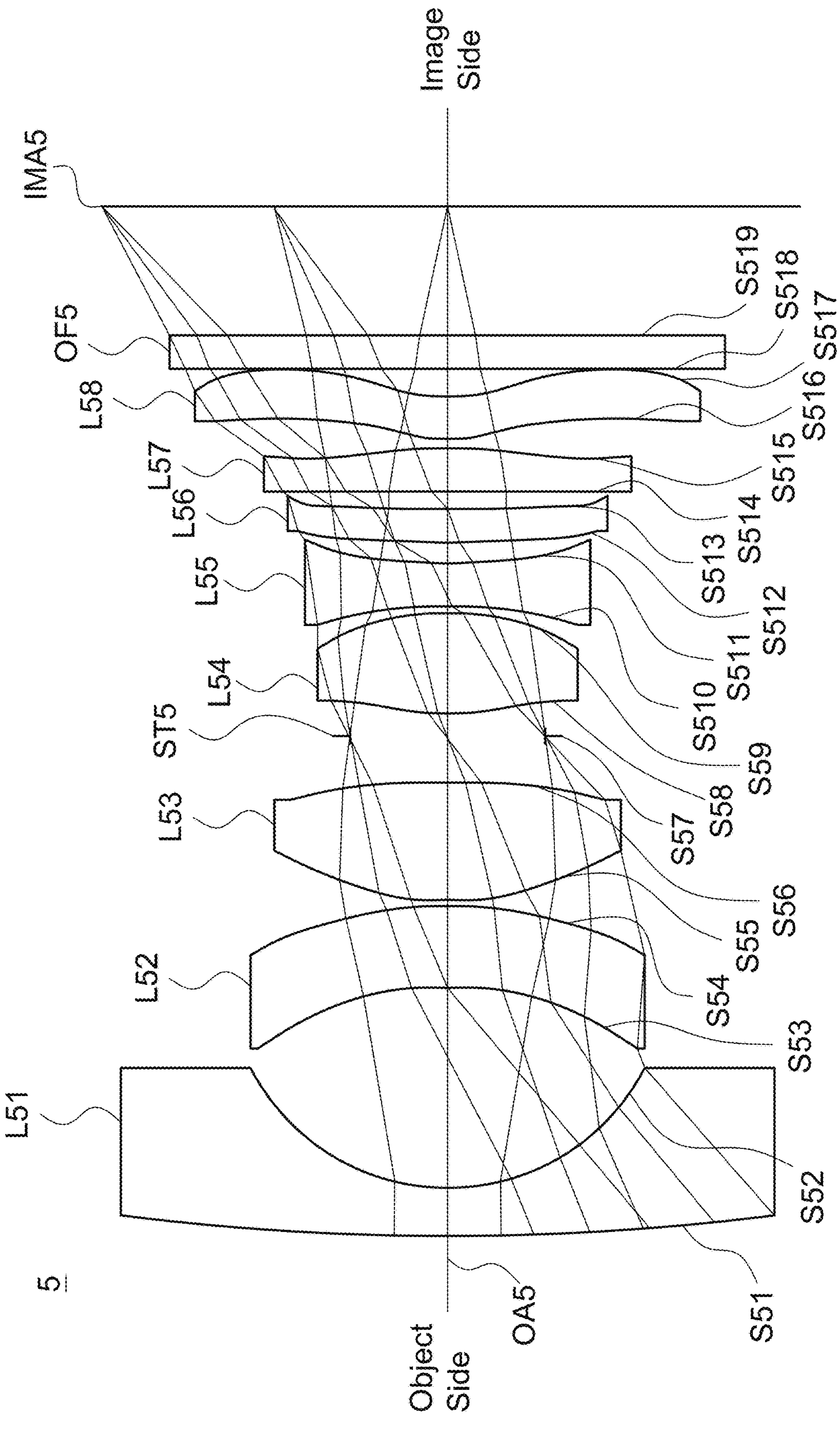

A detailed description of a wide-angle lens assembly in accordance with a fifth embodiment of the invention is as follows. Referring to FIG. 5, the wide-angle lens assembly 5 includes a first lens L51, a second lens L52, a third lens L53, a stop ST5, a fourth lens L54, a fifth lens L55, a sixth lens L56, a seventh lens L57, an eighth lens L58, and an optical filter OF5, all of which are arranged in order from an object side to an image side along an optical axis OA5. In operation, the light from the object side is imaged on an image plane IMA5.

According to the foregoing, wherein: both of the object side surface S51 and image side surface S52 of the first lens L51 are spherical surfaces; both of the object side surface S53 and image side surface S54 of the second lens L52 are spherical surfaces; the fifth lens L55 is a biconcave lens, wherein the image side surface S511 is a concave surface and both of the object side surface S510 and image side surface S511 are spherical surfaces; the sixth lens L56 is with positive refractive power; the seventh lens L57 is a meniscus lens, wherein the object side surface S514 is a concave surface; the eighth lens L58 is with negative refractive power; and both of object side surface S518 and image side surface S519 of the optical filter OF5 are plane surfaces; with the above design of the lenses, stop ST5, and at least one of the conditions (1)-(9) satisfied, the wide-angle lens assembly 5 can have an effective decreased total lens length, an effective increased field of view, and an effective corrected aberration. The wide-angle lens assembly of the present invention can meet the basic operation requirements when it only satisfies condition (7) and the refractive surface shape characteristics of the independent claim.

Table 13 shows the optical specification of the wide-angle lens assembly 5 in FIG. 5.

TABLE 13

Effective Focal Length = 2.28 mm F-number = 2.30
Total Lens Length = 9.48 mm Half Field of View = 83.02 degrees

| Surface Number | Radius of Curvature (mm) | Thickness (mm) | Nd | Vd | Effective Focal Length (mm) | Remark |
|---|---|---|---|---|---|---|
| S51 | 25.81 | 0.43 | 1.71 | 53.8 | −3.13 | L51 |
| S52 | 2.06 | 1.85 | | | | |
| S53 | −2.96 | 0.75 | 1.69 | 54.5 | −26.63 | L52 |
| S54 | −3.89 | 0.05 | | | | |
| S55 | 2.54 | 1.09 | 1.59 | 59.6 | 3.40 | L53 |
| S56 | −8.04 | 0.42 | | | | |
| S57 | ∞ | 0.22 | | | | ST5 |
| S58 | 3.31 | 0.92 | 1.59 | 59.6 | 2.69 | L54 |
| S59 | −2.73 | 0.06 | | | | |
| S510 | −4.51 | 0.39 | 1.85 | 23.8 | −2.38 | L55 |
| S511 | 3.90 | 0.19 | | | | |
| S512 | 4.79 | 0.31 | 1.54 | 56.1 | 19.41 | L56 |
| S513 | 8.63 | 0.18 | | | | |
| S514 | −5.15 | 0.40 | 1.54 | 56.1 | 10.99 | L57 |
| S515 | −2.83 | 0.09 | | | | |
| S516 | 1.50 | 0.37 | 1.54 | 56.1 | −19.41 | L58 |
| S517 | 1.20 | 0.27 | | | | |
| S518 | ∞ | 0.30 | 1.52 | 64.2 | | OF5 |
| S519 | ∞ | 1.19 | | | | |

In the fifth embodiment, the conic constant k and the aspheric coefficients A, B, C, D, E of each aspheric lens are shown in Table 14.

TABLE 14

| Surface Number | k | A | B | C | D | E |
|---|---|---|---|---|---|---|
| S55 | 0.2238 | −0.0106 | −0.0020 | −0.0006 | 0 | 0 |
| S56 | −26.3257 | −0.0154 | 0.0019 | −0.0002 | 0 | 0 |
| S58 | 4.2401 | −0.0475 | −0.0118 | −0.0053 | −0.0046 | 0.0015 |
| S59 | −1.2408 | −0.0309 | −0.0022 | 0.0022 | −0.0051 | 0.0018 |
| S512 | −14.3514 | −0.0410 | −0.0137 | 0.0192 | 0.0006 | −0.0015 |
| S513 | 26.2757 | 0.0206 | −0.0938 | 0.0606 | −0.0113 | 5.52E−05 |
| S514 | −176.3470 | 0.1382 | −0.1475 | 0.0794 | −0.0235 | 0.0030 |

TABLE 14-continued

| Surface Number | k | A | B | C | D | E |
|---|---|---|---|---|---|---|
| S515 | −28.5753 | 0.0251 | −0.0070 | 0.0063 | −0.0028 | 0.0004 |
| S516 | −6.0882 | −0.1134 | 0.0342 | −0.0028 | −0.0003 | 4.27E−05 |
| S517 | −4.9836 | −0.0865 | 0.0287 | −0.0065 | 0.0009 | −5.7E−05 |

Table 15 shows the parameters and condition values for conditions (1)-(9) in accordance with the fifth embodiment of the invention. It can be seen from Table 15 that the wide-angle lens assembly 5 of the fifth embodiment satisfies the conditions (1)-(9).

TABLE 15

| | | | | | |
|---|---|---|---|---|---|
| f123 | 4.45 mm | θ | 83.02 degrees | CT2 | 0.75 mm |
| CT6 | 0.31 mm | T34 | 0.64 mm | T67 | 0.18 mm |
| f2/f | −11.71 | TTL/f | 4.17 | (R21 + R22)/(R21 − R22) | −7.38 |
| f123/f | 1.96 | θ/TTL | 8.76 degrees/mm | (R21 + R22)/CT2 | −9.13 |
| (R61 + R62)/CT6 | 43.41 | TTL/T34 | 14.77 | TTL/T67 | 52.97 |

Figure 6:
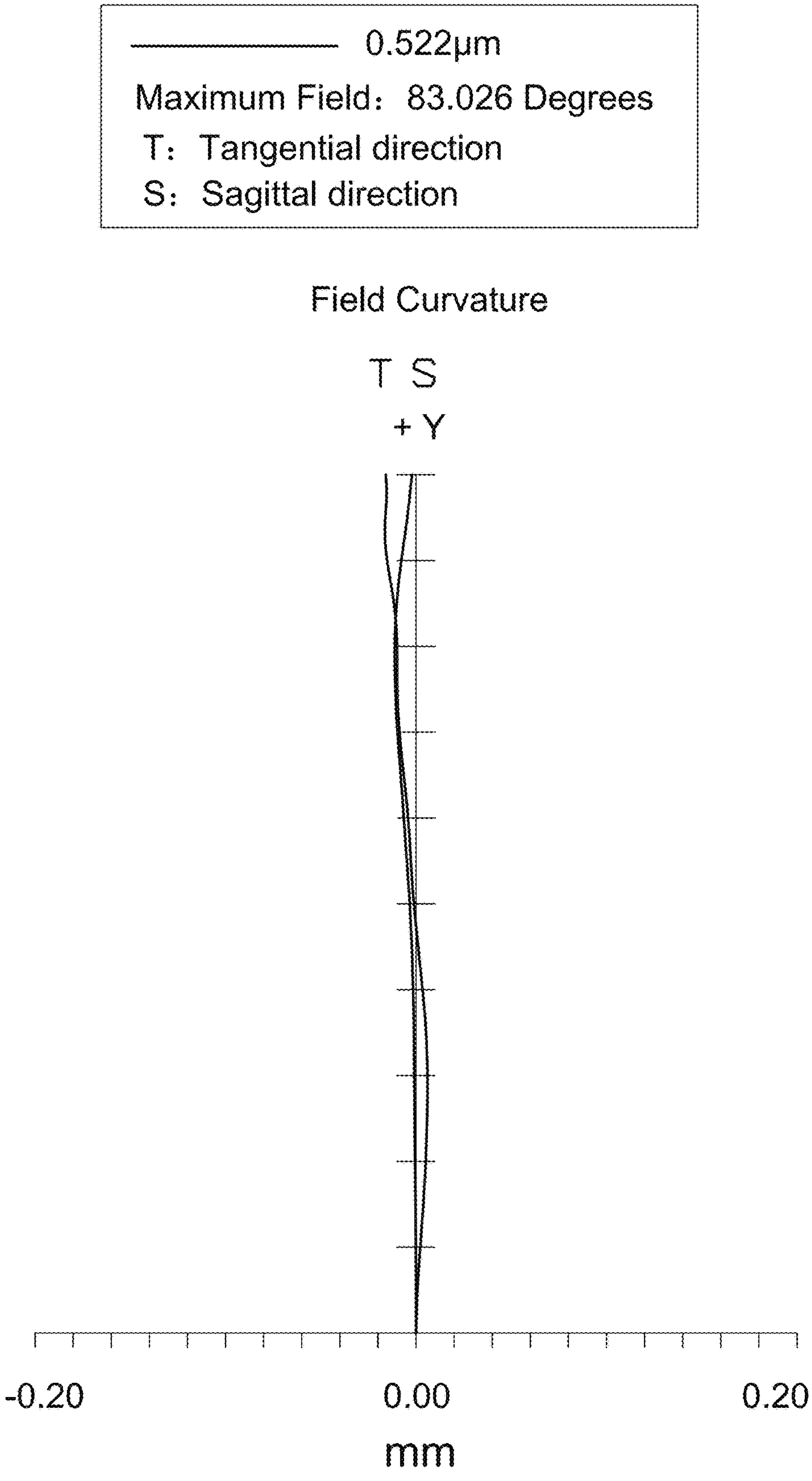
FIGS. 6, 7, 8 depict a field curvature diagram, a distortion diagram, and a spot diagram of the wide-angle lens assembly in accordance with the fifth embodiment of the invention, respectively.
Figure 7:
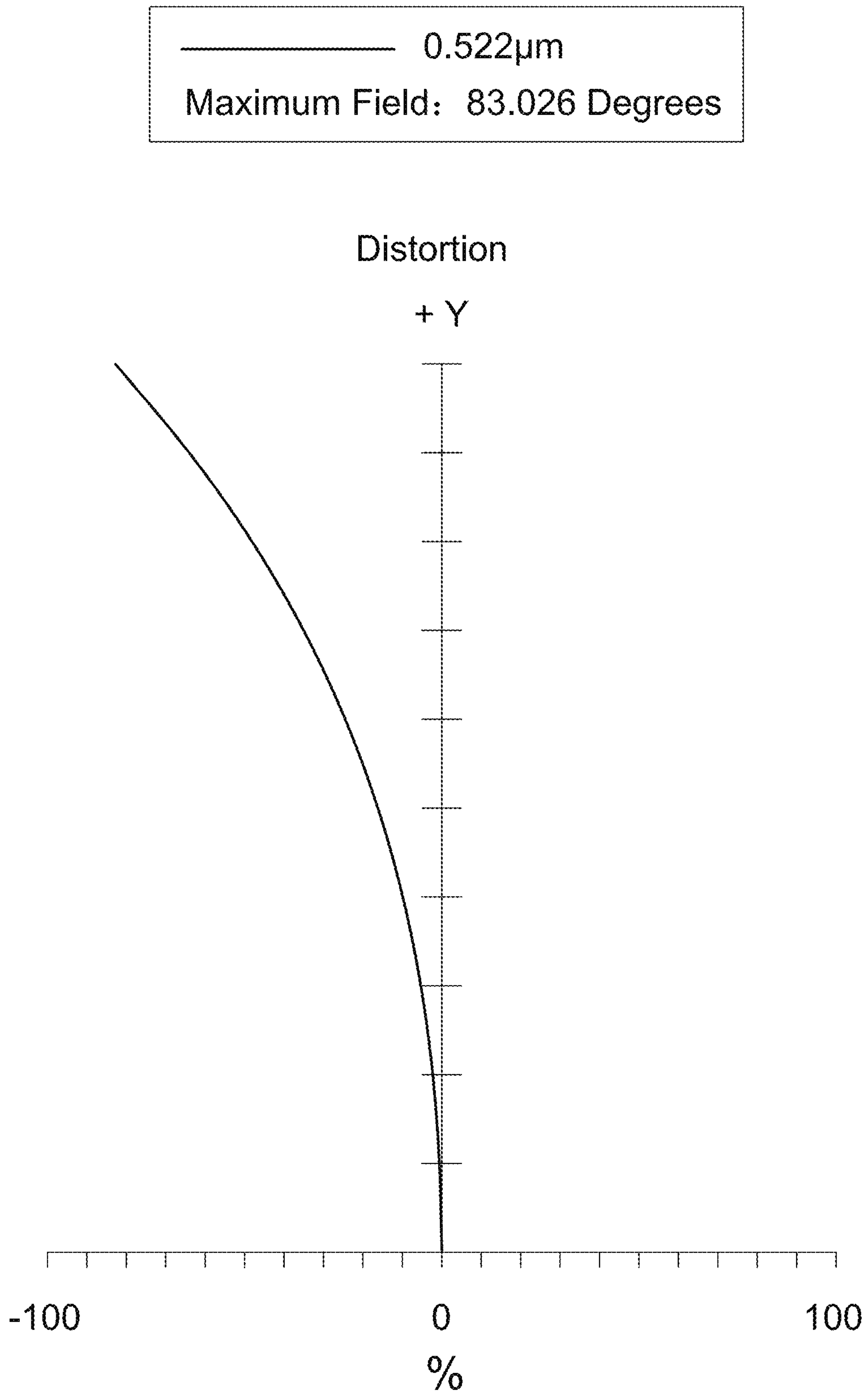
Figure 8:
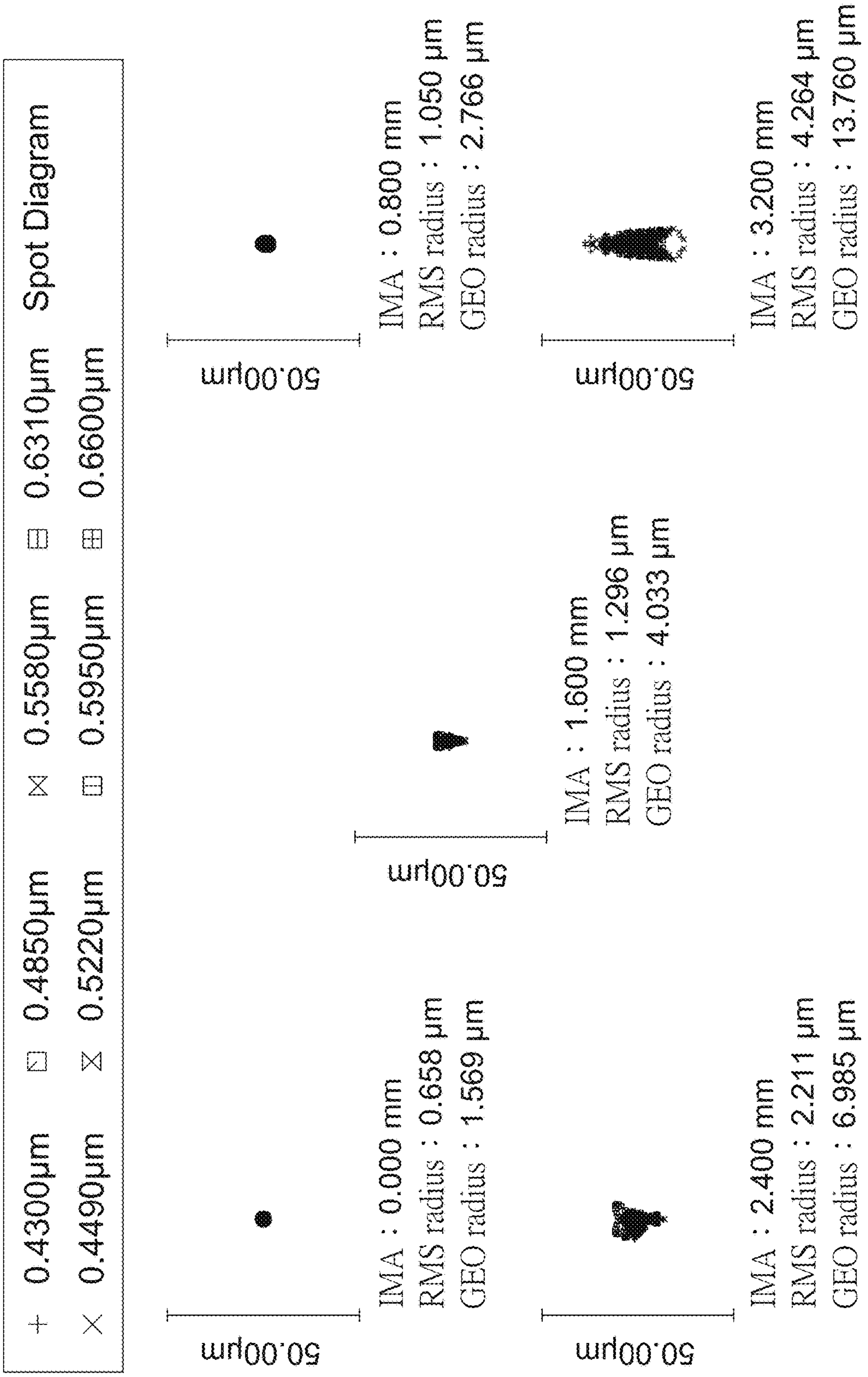

In addition, the wide-angle lens assembly 5 of the fifth embodiment can meet the requirements of optical performance as seen in FIGS. 6-8. It can be seen from FIG. 6 that the field curvature of tangential direction and sagittal direction in the wide-angle lens assembly 5 of the fifth embodiment ranges from −0.02 mm to 0.01 mm. It can be seen from FIG. 7 that the distortion in the wide-angle lens assembly 5 of the fifth embodiment ranges from −85% to 0%. It can be seen from FIG. 8 that the root mean square spot radius is equal to 0.658 m and geometrical spot radius is equal to 1.569 m as image height is equal to 0.000 mm, the root mean square spot radius is equal to 1.050 m and geometrical spot radius is equal to 2.766 m as image height is equal to 0.800 mm, the root mean square spot radius is equal to 1.296 m and geometrical spot radius is equal to 4.033 m as image height is equal to 1.600 mm, the root mean square spot radius is equal to 2.211 m and geometrical spot radius is equal to 6.985 m as image height is equal to 2.400 mm, and the root mean square spot radius is equal to 4.264 m and geometrical spot radius is equal to 13.760 m as image height is equal to 3.200 mm for the wide-angle lens assembly 5 of the fifth embodiment. It is obvious that the field curvature, and the distortion of the wide-angle lens assembly 5 of the fifth embodiment can be corrected effectively. Therefore, the wide-angle lens assembly 5 of the fifth embodiment is capable of good optical performance.

Figure 9:
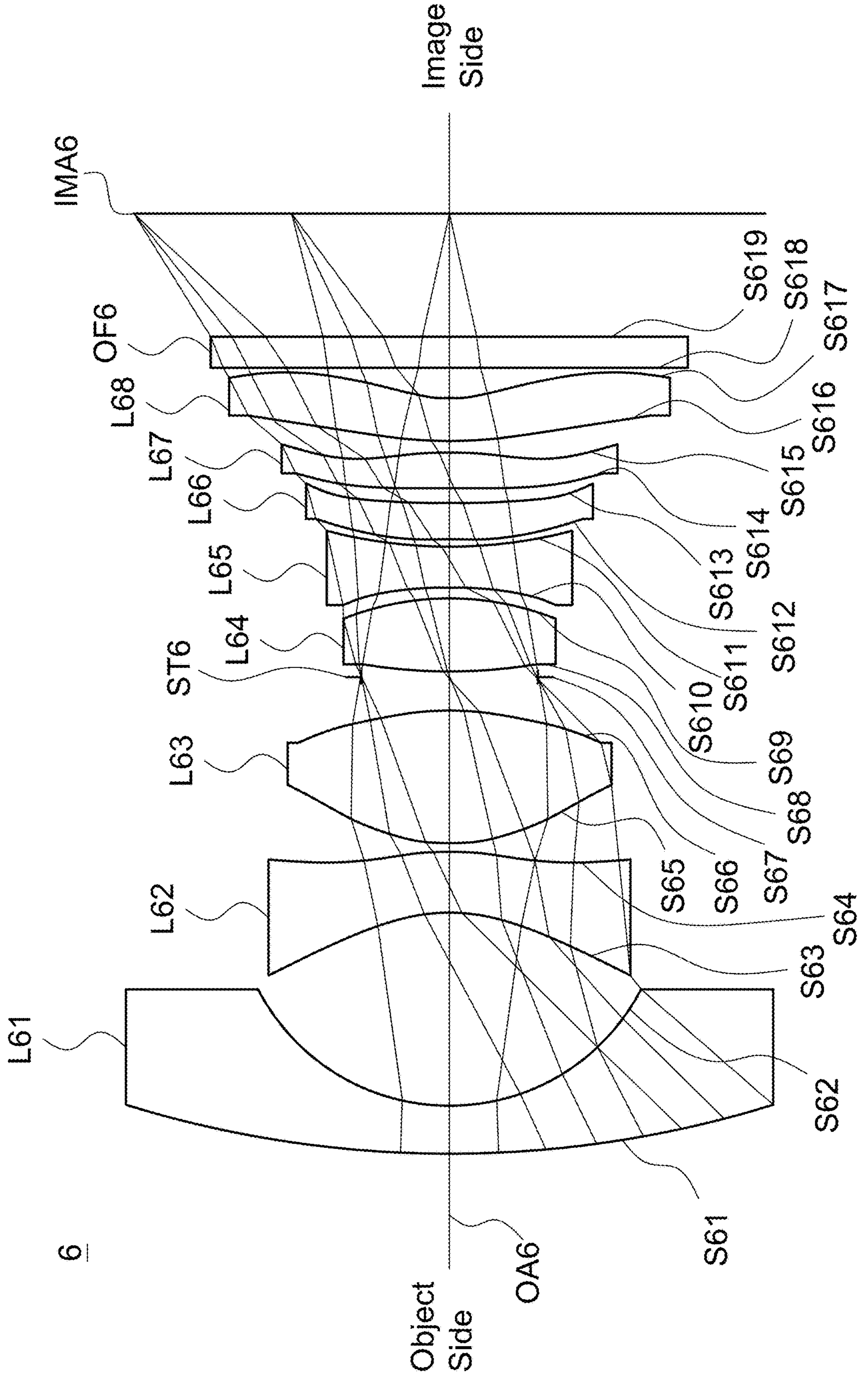
FIG. 9 is a lens layout and optical path diagram of a wide-angle lens assembly in accordance with a sixth embodiment of the invention.

A detailed description of a wide-angle lens assembly in accordance with a sixth embodiment of the invention is as follows. Referring to FIG. 9, the wide-angle lens assembly 6 includes a first lens L61, a second lens L62, a third lens L63, a stop ST6, a fourth lens L64, a fifth lens L65, a sixth lens L66, a seventh lens L67, an eighth lens L68, and an optical filter OF6, all of which are arranged in order from an object side to an image side along an optical axis OA6. In operation, the light from the object side is imaged on an image plane IMA6.

According to the foregoing, wherein: both of the object side surface S61 and image side surface S62 of the first lens L61 are spherical surfaces; both of the object side surface S63 and image side surface S64 of the second lens L62 are aspheric surfaces; the fifth lens L65 is a biconcave lens, wherein the image side surface S611 is a concave surface and both of the object side surface S610 and image side surface S611 are spherical surfaces; the sixth lens L66 is with positive refractive power; the seventh lens L67 is a meniscus lens, wherein the object side surface S614 is a concave surface; the eighth lens L68 is with negative refractive power; and both of object side surface S618 and image side surface S619 of the optical filter OF6 are plane surfaces; with the above design of the lenses, stop ST6, and at least one of the conditions (1)-(9) satisfied, the wide-angle lens assembly 6 can have an effective decreased total lens length, an effective increased field of view, and an effective corrected aberration. The wide-angle lens assembly of the present invention can meet the basic operation requirements when it only satisfies condition (8) and the refractive surface shape characteristics of the independent claim.

Table 16 shows the optical specification of the wide-angle lens assembly 6 in FIG. 9.

TABLE 16

Effective Focal Length = 2.14 mm F-number = 2.30
Total Lens Length = 8.98 mm Half Field of View = 81.00 degrees

| Surface Number | Radius of Curvature (mm) | Thickness (mm) | Nd | Vd | Effective Focal Length (mm) | Remark |
|---|---|---|---|---|---|---|
| S61 | 10.61 | 0.45 | 1.71 | 53.8 | −3.64 | L61 |
| S62 | 2.06 | 1.85 | | | | |
| S63 | −1.56 | 0.57 | 1.68 | 54.9 | −4.40 | L62 |
| S64 | −3.74 | 0.10 | | | | |
| S65 | 1.78 | 1.27 | 1.59 | 59.6 | 2.10 | L63 |
| S66 | −2.95 | 0.32 | | | | |
| S67 | ∞ | 0.06 | | | | ST6 |
| S68 | 5.65 | 0.69 | 1.59 | 59.6 | 3.57 | L64 |
| S69 | −3.19 | 0.10 | | | | |
| S610 | −3.27 | 0.39 | 1.85 | 23.8 | −2.13 | L65 |
| S611 | 4.38 | 0.06 | | | | |
| S612 | 3.48 | 0.36 | 1.54 | 56.1 | 8.26 | L66 |
| S613 | 15.44 | 0.15 | | | | |
| S614 | −5.74 | 0.33 | 1.54 | 56.1 | 6.40 | L67 |
| S615 | −2.20 | 0.10 | | | | |
| S616 | 2.07 | 0.42 | 1.54 | 56.1 | −8.31 | L68 |
| S617 | 1.32 | 0.29 | | | | |
| S618 | ∞ | 0.30 | 1.52 | 64.2 | | OF6 |
| S619 | ∞ | 1.16 | | | | |

In the sixth embodiment, the conic constant k and the aspheric coefficients A, B, C, D, E of each aspheric lens are shown in Table 17.

TABLE 17

| Surface Number | k | A | B | C | D | E |
|---|---|---|---|---|---|---|
| S63 | −3.6999 | 0.0057 | −0.0011 | −4.1E−05 | 0 | 0 |
| S64 | −14.8701 | 0.0306 | 0.0035 | −0.0020 | 0 | 0 |
| S65 | −0.8282 | −0.0227 | 0.0128 | −0.0053 | 0 | 0 |
| S66 | −2.1096 | 0.0210 | −0.0083 | 0.0006 | 0 | 0 |
| S68 | −1.3989 | 0.0160 | −0.0344 | 0.0104 | −0.0090 | 0 |
| S69 | −9.0317 | −0.0735 | 0.0134 | −0.0054 | 0.0015 | 0 |
| S612 | −10.8271 | 0.0090 | 0.0085 | −0.0258 | 0.0217 | −0.0053 |
| S613 | 104.1244 | 0.0754 | −0.0823 | 0.0473 | −0.0083 | −0.0006 |
| S614 | −204.1790 | 0.1849 | −0.1710 | 0.0944 | −0.0288 | 0.0036 |
| S615 | −17.6024 | 0.1264 | −0.0378 | 0.0075 | −0.0026 | 0.0005 |
| S616 | −12.8338 | −0.0620 | 0.0297 | −0.0067 | 0.0009 | −5.8E−05 |
| S617 | −7.8451 | −0.0660 | 0.0257 | −0.0075 | 0.0013 | −9.9E−05 |

Table 18 shows the parameters and condition values for conditions (1)-(9) in accordance with the sixth embodiment of the invention. It can be seen from Table 18 that the wide-angle lens assembly 6 of the sixth embodiment satisfies the conditions (1)-(9).

TABLE 18

| | | | | | |
|---|---|---|---|---|---|
| f123 | 2.59 mm | θ | 81.00 degrees | CT2 | 0.57 mm |
| CT6 | 0.36 mm | T34 | 0.38 mm | T67 | 0.15 mm |
| f2/f | −2.06 | TTL/f | 4.21 | (R21 + R22)/(R21 − R22) | −2.43 |
| f123/f | 1.21 | θ/TTL | 9.02 degrees/mm | (R21 + R22)/CT2 | −9.30 |
| (R61 + R62)/CT6 | 52.42 | TTL/T34 | 23.45 | TTL/T67 | 59.09 |

Figure 10:
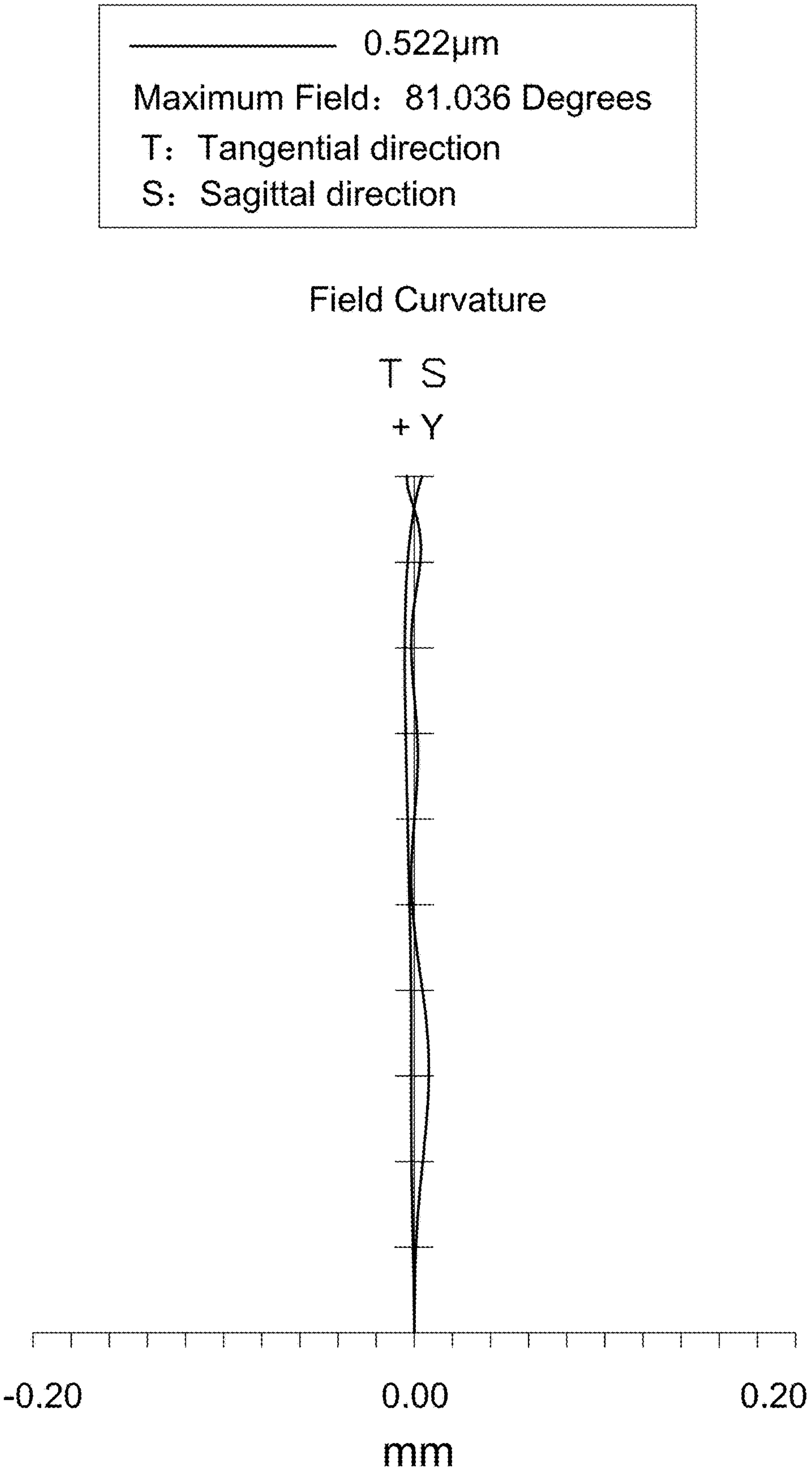
FIGS. 10, 11, 12 depict a field curvature diagram, a distortion diagram, and a spot diagram of the wide-angle lens assembly in accordance with the sixth embodiment of the invention, respectively.
Figure 11:
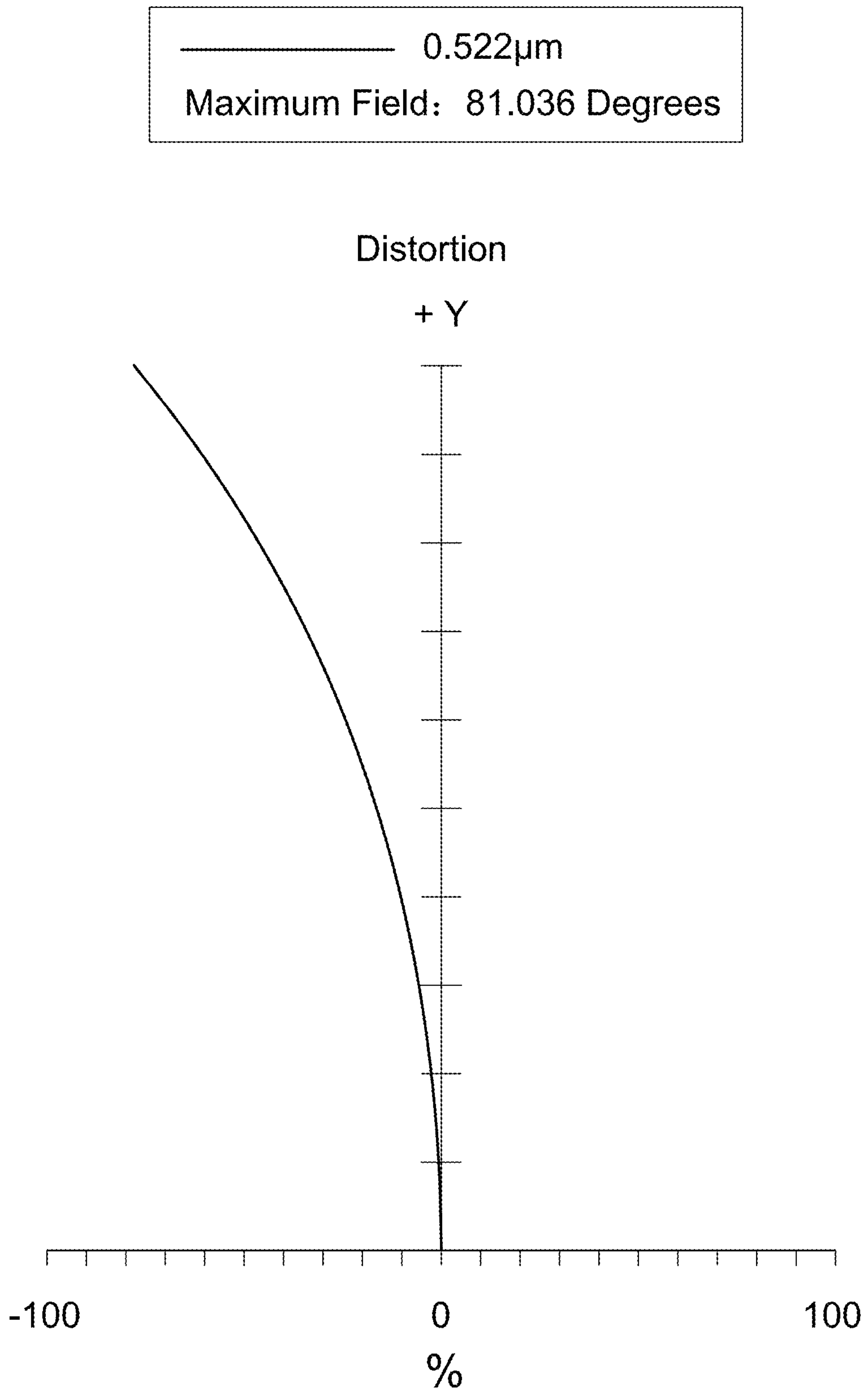
Figure 12:
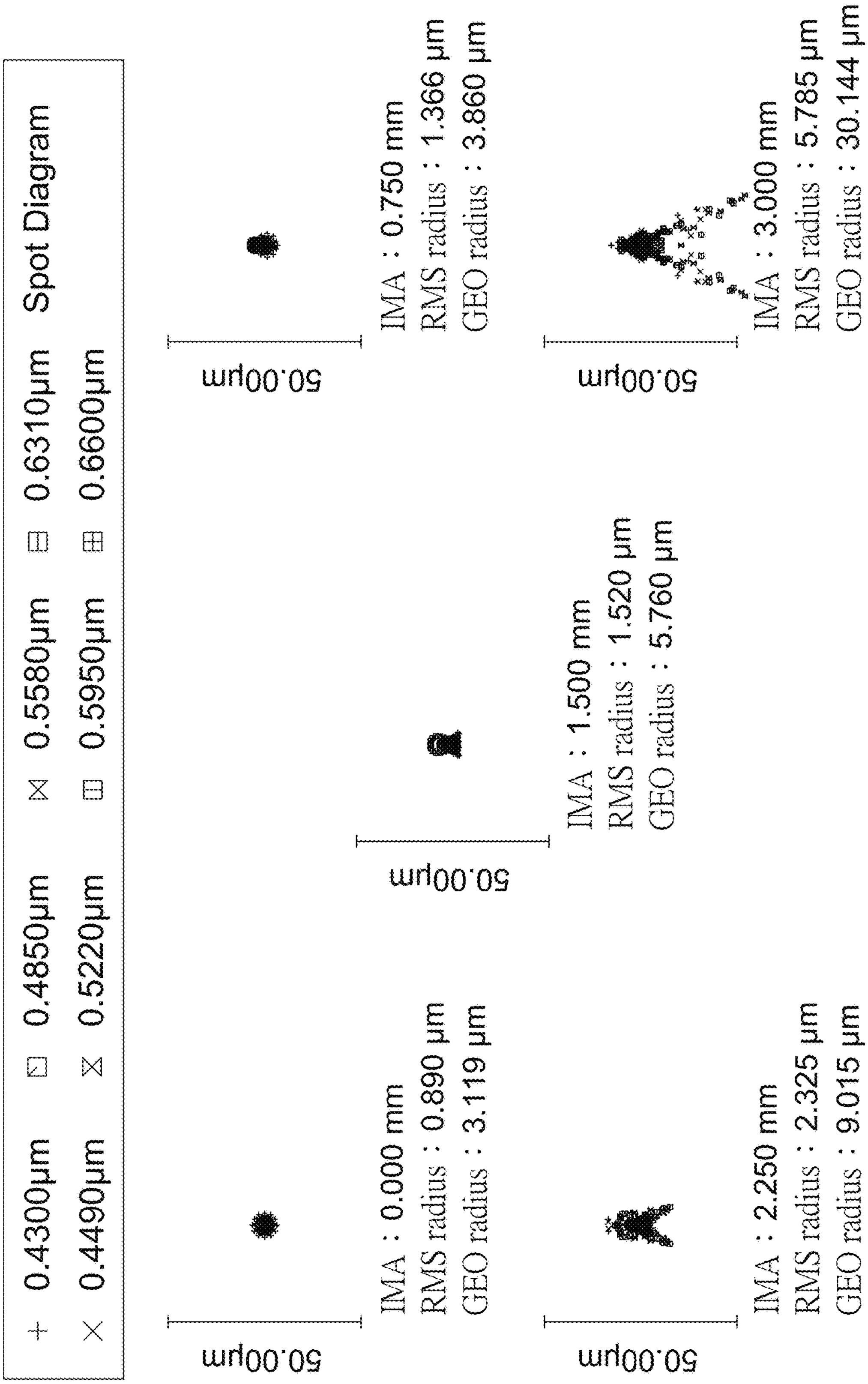

In addition, the wide-angle lens assembly 6 of the sixth embodiment can meet the requirements of optical performance as seen in FIGS. 10-12. It can be seen from FIG. 10 that the field curvature of tangential direction and sagittal direction in the wide-angle lens assembly 6 of the sixth embodiment ranges from −0.01 mm to 0.01 mm. It can be seen from FIG. 11 that the distortion in the wide-angle lens assembly 6 of the sixth embodiment ranges from −80% to 0%. It can be seen from FIG. 12 that the root mean square spot radius is equal to 0.890 m and geometrical spot radius is equal to 3.119 m as image height is equal to 0.000 mm, the root mean square spot radius is equal to 1.366 m and geometrical spot radius is equal to 3.860 m as image height is equal to 0.800 mm, the root mean square spot radius is equal to 1.520 m and geometrical spot radius is equal to 5.760 m as image height is equal to 1.600 mm, the root mean square spot radius is equal to 2.325 m and geometrical spot radius is equal to 9.015 m as image height is equal to 2.400 mm, and the root mean square spot radius is equal to 5.785 m and geometrical spot radius is equal to 30.144 m as image height is equal to 3.200 mm for the wide-angle lens assembly 6 of the sixth embodiment. It is obvious that the field curvature, and the distortion of the wide-angle lens assembly 6 of the sixth embodiment can be corrected effectively. Therefore, the wide-angle lens assembly 6 of the sixth embodiment is capable of good optical performance.

Figure 13:
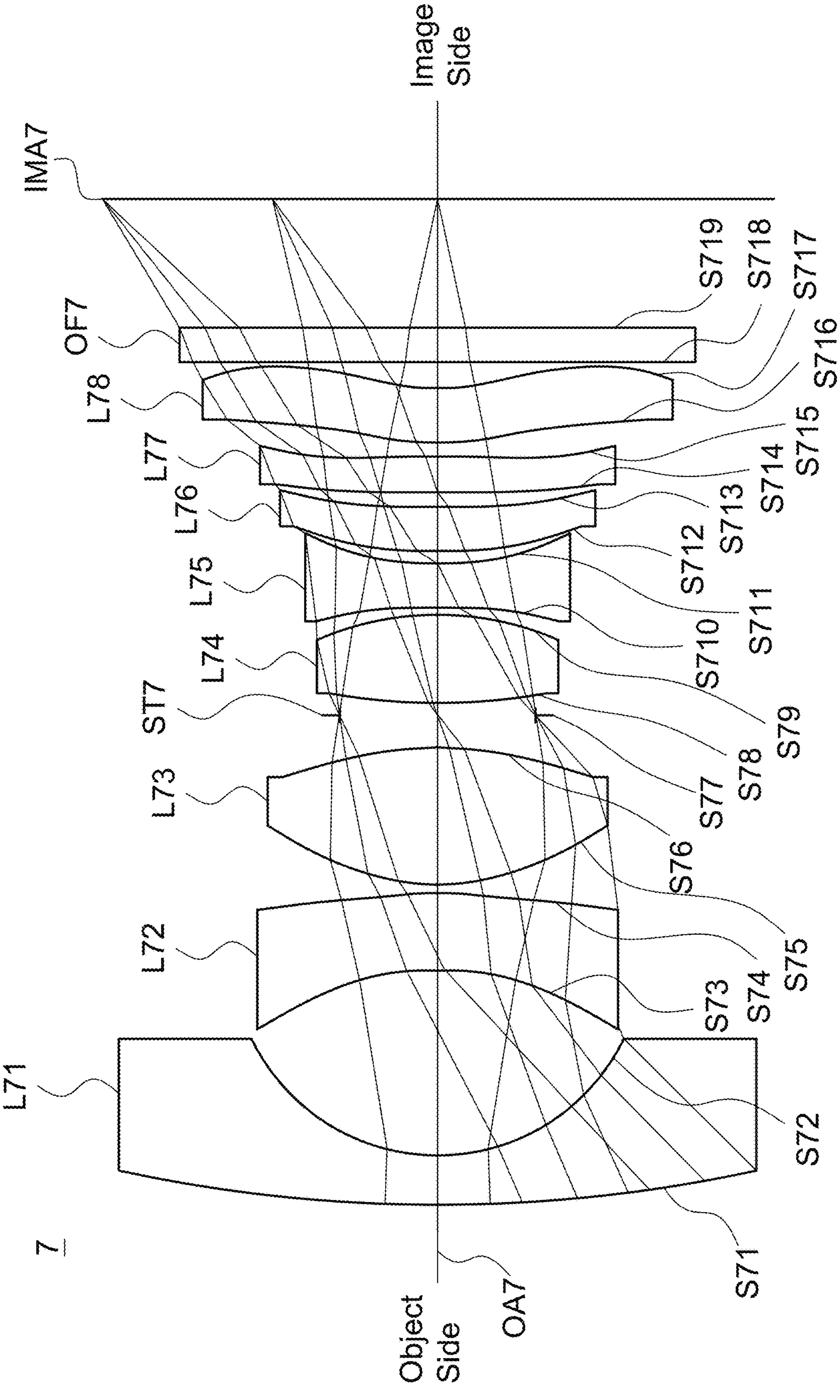
FIG. 13 is a lens layout and optical path diagram of a wide-angle lens assembly in accordance with a seventh embodiment of the invention.

A detailed description of a wide-angle lens assembly in accordance with a seventh embodiment of the invention is as follows. Referring to FIG. 13, the wide-angle lens assembly 7 includes a first lens L71, a second lens L72, a third lens L73, a stop ST7, a fourth lens L74, a fifth lens L75, a sixth lens L76, a seventh lens L77, an eighth lens L78, and an optical filter OF7, all of which are arranged in order from an object side to an image side along an optical axis OA7. In operation, the light from the object side is imaged on an image plane IMA7.

According to the foregoing, wherein: both of the object side surface S71 and image side surface S72 of the first lens L71 are spherical surfaces; both of the object side surface S73 and image side surface S74 of the second lens L72 are aspheric surfaces; the fifth lens L75 is a biconcave lens, wherein the image side surface S711 is a concave surface and both of the object side surface S710 and image side surface S711 are spherical surfaces; the sixth lens L76 is with positive refractive power; the seventh lens L77 is a meniscus lens, wherein the object side surface S714 is a concave surface; the eighth lens L78 is with positive refractive power; and both of object side surface S718 and image side surface S719 of the optical filter OF7 are plane surfaces; with the above design of the lenses, stop ST7, and at least one of the conditions (1)-(9) satisfied, the wide-angle lens assembly 7 can have an effective decreased total lens length, an effective increased field of view, and an effective corrected aberration. The wide-angle lens assembly of the present invention can meet the basic operation requirements when it only satisfies condition (9) and the refractive surface shape characteristics of the independent claim.

Table 19 shows the optical specification of the wide-angle lens assembly 7 in FIG. 13.

TABLE 19

Effective Focal Length = 2.16 mm F-number = 2.30
Total Lens Length = 9.00 mm Half Field of View = 81.05 degrees

| Surface Number | Radius of Curvature (mm) | Thickness (mm) | Nd | Vd | Effective Focal Length (mm) | Remark |
|---|---|---|---|---|---|---|
| S71 | 12.89 | 0.45 | 1.71 | 53.8 | −3.09 | L71 |
| S72 | 1.86 | 1.66 | | | | |
| S73 | −2.28 | 0.68 | 1.68 | 54.9 | −6.72 | L72 |
| S74 | −5.10 | 0.08 | | | | |
| S75 | 2.19 | 1.22 | 1.59 | 59.6 | 2.37 | L73 |
| S76 | −3.07 | 0.29 | | | | |
| S77 | ∞ | 0.12 | | | | ST7 |
| S78 | 4.06 | 0.80 | 1.59 | 59.6 | 3.01 | L74 |
| S79 | −2.91 | 0.05 | | | | |
| S710 | −5.56 | 0.40 | 1.85 | 23.8 | −2.11 | L75 |
| S711 | 2.79 | 0.11 | | | | |
| S712 | 3.59 | 0.40 | 1.54 | 56.1 | 8.69 | L76 |
| S713 | 14.75 | 0.14 | | | | |
| S714 | −5.03 | 0.32 | 1.54 | 56.1 | 18.84 | L77 |
| S715 | −3.44 | 0.12 | | | | |
| S716 | 2.13 | 0.48 | 1.54 | 56.1 | 19.6 | L78 |
| S717 | 1.64 | 0.24 | | | | |
| S718 | ∞ | 0.30 | 1.52 | 64.2 | | OF7 |
| S719 | ∞ | 1.15 | | | | |

In the seventh embodiment, the conic constant k and the aspheric coefficients A, B, C, D, E of each aspheric lens are shown in Table 20.

TABLE 20

| Surface Number | k | A | B | C | D | E |
|---|---|---|---|---|---|---|
| S73 | −2.6042 | −0.0124 | 0.0033 | −0.0005 | 0 | 0 |
| S74 | −0.4401 | 0.0169 | 0.0026 | −0.0012 | 0 | 0 |
| S75 | −0.2957 | −0.0037 | 0.0008 | −0.0015 | 0 | 0 |
| S76 | −1.7429 | 0.0199 | −0.0052 | 0.0007 | 0 | 0 |
| S78 | −10.0888 | 0.0149 | −0.0272 | 0.0056 | −0.0062 | 0 |
| S79 | −9.2154 | −0.0635 | 0.0218 | −0.0127 | 0.0012 | 0 |
| S712 | −9.6737 | 0.0103 | 0.0205 | −0.0242 | 0.0141 | −0.0036 |
| S713 | 94.8248 | 0.0710 | −0.0763 | 0.0424 | −0.0085 | −0.0004 |
| S714 | −155.4560 | 0.1834 | −0.1785 | 0.0931 | −0.0280 | 0.0039 |
| S715 | −48.5441 | 0.0997 | −0.0373 | 0.0103 | −0.0035 | 0.0006 |
| S716 | −10.8428 | −0.0775 | 0.0349 | −0.0071 | 0.0007 | −2.5E−05 |
| S717 | −8.3016 | −0.0651 | 0.0227 | −0.0062 | 0.0011 | −8.2E−05 |

Table 21 shows the parameters and condition values for conditions (1)-(9) in accordance with the seventh embodiment of the invention. It can be seen from Table 21 that the wide-angle lens assembly 7 of the seventh embodiment satisfies the conditions (1)-(9).

TABLE 21

| | | | | | |
|---|---|---|---|---|---|
| f123 | 2.96 mm | θ | 81.05 degrees | CT2 | 0.68 mm |
| CT6 | 0.40 mm | T34 | 0.41 mm | T67 | 0.14 mm |
| f2/f | −3.11 | TTL/f | 4.16 | (R21 + R22)/(R21 − R22) | −2.61 |
| f123/f | 1.37 | θ/TTL | 9.01 degrees/mm | (R21 + R22)/CT2 | −10.81 |
| (R61 + R62)/CT6 | 45.72 | TTL/T34 | 22.16 | TTL/T67 | 66.15 |

Figure 14:
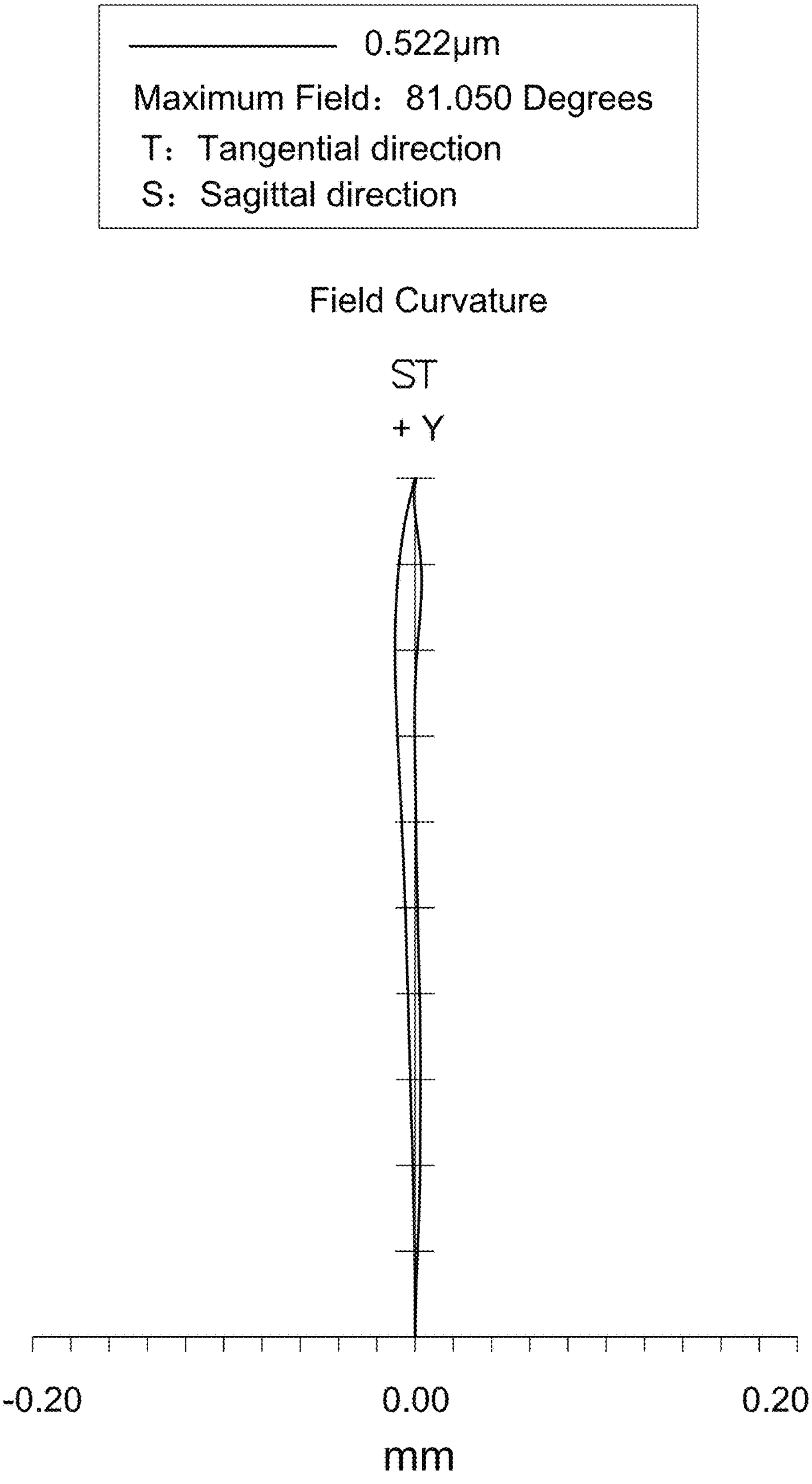
FIGS. 14, 15, 16 depict a field curvature diagram, a distortion diagram, and a spot diagram of the wide-angle lens assembly in accordance with the seventh embodiment of the invention, respectively.
Figure 15:
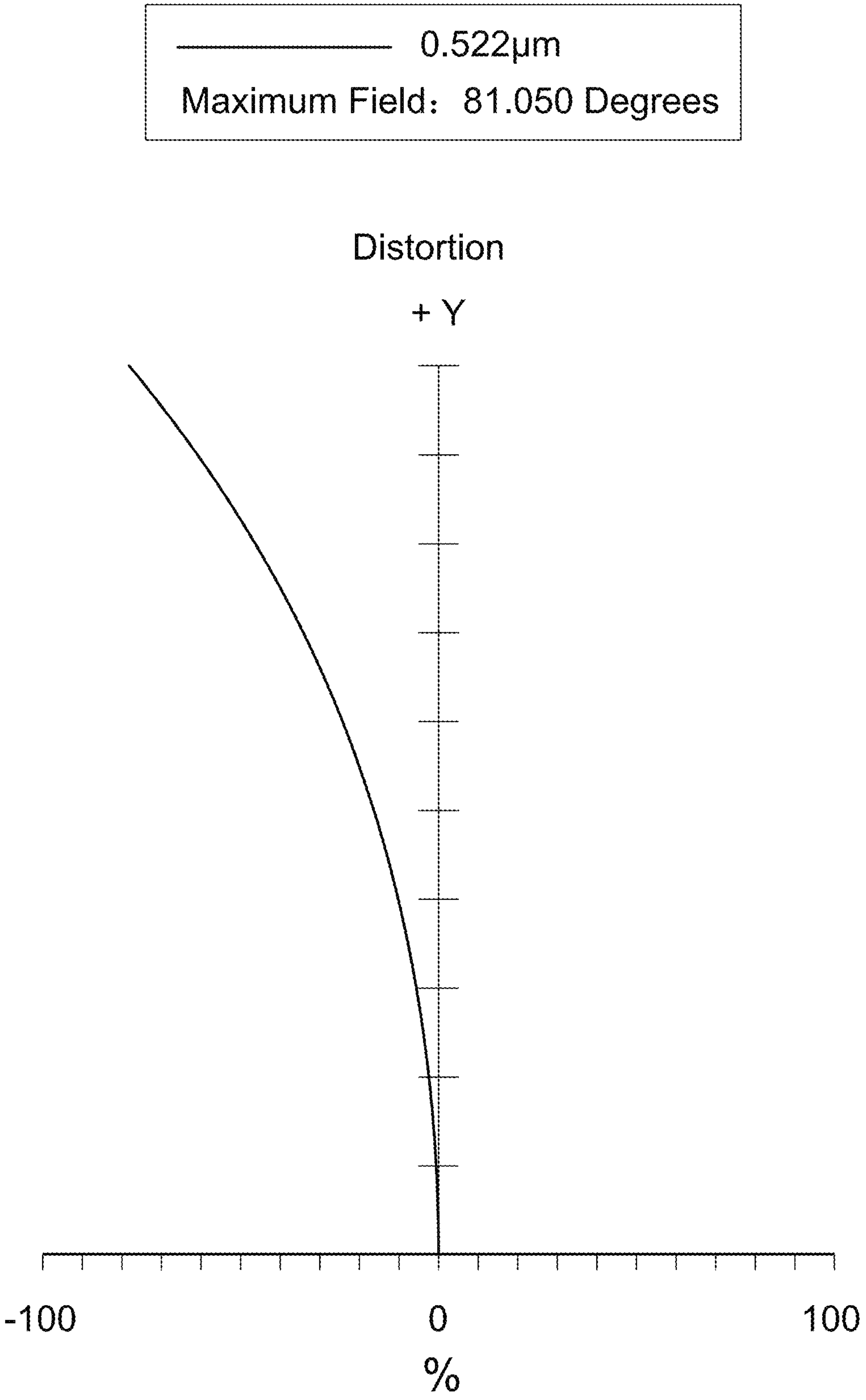
Figure 16:
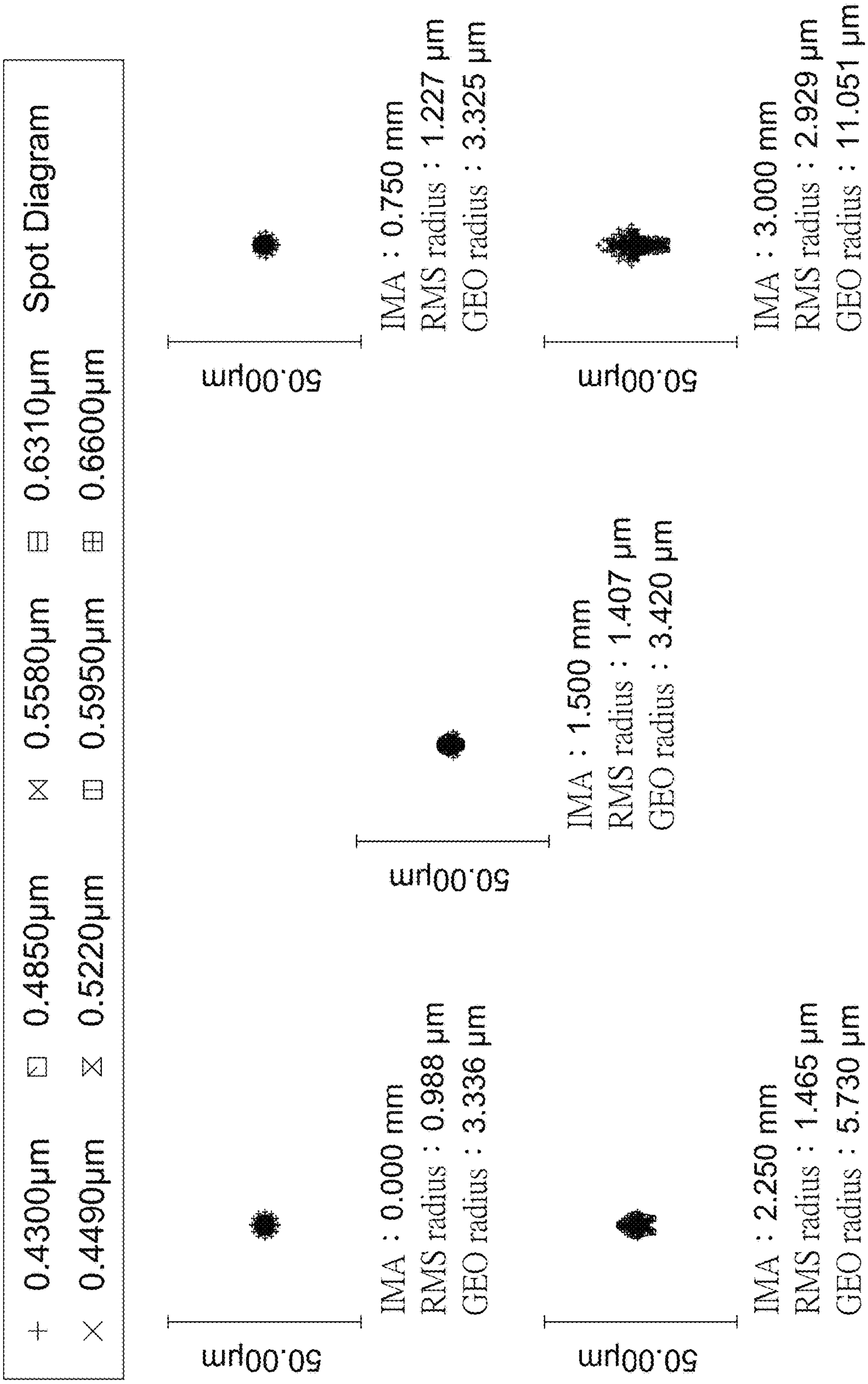

In addition, the wide-angle lens assembly 7 of the seventh embodiment can meet the requirements of optical performance as seen in FIGS. 14-16. It can be seen from FIG. 14 that the field curvature of tangential direction and sagittal direction in the wide-angle lens assembly 7 of the seventh embodiment ranges from −0.01 mm to 0.01 mm. It can be seen from FIG. 15 that the distortion in the wide-angle lens assembly 7 of the seventh embodiment ranges from −80% to 0%. It can be seen from FIG. 16 that the root mean square spot radius is equal to 0.988 m and geometrical spot radius is equal to 3.336 m as image height is equal to 0.000 mm, the root mean square spot radius is equal to 1.227 m and geometrical spot radius is equal to 3.325 m as image height is equal to 0.800 mm, the root mean square spot radius is equal to 1.407 m and geometrical spot radius is equal to 3.420 m as image height is equal to 1.600 mm, the root mean square spot radius is equal to 1.465 m and geometrical spot radius is equal to 5.730 m as image height is equal to 2.400 mm, and the root mean square spot radius is equal to 2.929 m and geometrical spot radius is equal to 11.051 m as image height is equal to 3.200 mm for the wide-angle lens assembly 7 of the seventh embodiment. It is obvious that the field curvature, and the distortion of the wide-angle lens assembly 7 of the seventh embodiment can be corrected effectively. Therefore, the wide-angle lens assembly 7 of the seventh embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wide-angle lens assembly comprising:

a first lens which is a meniscus lens with negative refractive power;

a second lens which is a meniscus lens with refractive power and comprises a concave surface facing an object side and a convex surface facing an image side;

a third lens which is with positive refractive power;

a fourth lens which is with positive refractive power;

a fifth lens which is with negative refractive power;

a sixth lens which is with refractive power;

a seventh lens which is with positive refractive power and comprises a convex surface facing the image side; and an eighth lens which is with refractive power and comprises a convex surface facing the object side;

wherein the first lens, the second lens, the third lens, the fourth lens, the fifth lens, the sixth lens, the seventh lens, and the eighth lens are arranged in order from the object side to the image side along an optical axis;

wherein the first lens, the second lens, the third lens, the fourth lens, the fifth lens, the sixth lens, the seventh lens, and the eighth lens are spaced apart with air gaps formed therebetween;

wherein the second lens is with negative refractive power:

wherein the third lens comprises a convex surface facing the image side.

2. The wide-angle lens assembly as claimed in claim 1, wherein the sixth lens is with positive refractive power.

3. The wide-angle lens assembly as claimed in claim 2, wherein:

the fifth lens comprises a concave surface facing the image side; and the seventh lens is a meniscus lens and further comprises a concave surface facing the object side.

4. The wide-angle lens assembly as claimed in claim 3, wherein the wide-angle lens assembly satisfies at least one of following conditions:

$$-14<f2/f<0;$$

$$2.5\leq TTL/f\leq 4.5;$$

$$-11<(R21+R22)/(R21-R22)<0;$$

$$1\leq f123/f\leq 3.2;$$

$$8.5\ \text{degrees/mm} \le \theta/TTL \le 10\ \text{degrees/mm};$$

$$-10.99 \le (R21+R22)/CT2 \le -7.04;$$

$$39.16 \le (R61+R62)/CT6 \le 109.93;$$

$$13.22 \le TTL/T34 \le 27.12;$$

$$46.71 < TTL/T67 \le 92.54;$$

wherein f is an effective focal length of the wide-angle lens assembly, f2 is an effective focal length of the second lens, f123 is an effective focal length of a combination of the first lens, the second lens, and the third lens, TTL is an interval from an object side surface of the first lens to an image plane along the optical axis, R21 is a radius of curvature of an object side surface of the second lens, R22 is a radius of curvature of an image side surface of the second lens, R61 is a radius of curvature of an object side surface of the sixth lens, R62 is a radius of curvature of an image side surface of the sixth lens, CT2 is an interval from the object side surface of the second lens to the image side surface of the second lens along the optical axis, CT6 is an interval from the object side surface of the sixth lens to the image side surface of the sixth lens along the optical axis, T34 is an interval from an image side surface of the third lens to an object side surface of the fourth lens along the optical axis, T67 is an interval from the image side surface of the sixth lens to an object side surface of the seventh lens along the optical axis, and θ is a half field of view of the wide-angle lens assembly.

5. The wide-angle lens assembly as claimed in claim 2, wherein the eighth lens is with positive refractive power.

6. The wide-angle lens assembly as claimed in claim 5, wherein the wide-angle lens assembly satisfies at least one of following conditions:

$$-14 < f2/f < 0;$$

$$2.5 \le TTL/f \le 4.5;$$

$$-11 < (R21+R22)/(R21-R22) < 0;$$

$$1 \le f123/f \le 3.2;$$

$$8.5\ \text{degrees/mm} \le \theta/TTL \le 10\ \text{degrees/mm};$$

$$10.99 \le (R21+R22)/CT2 \le -7.04;$$

$$39.16 \le (R61+R62)/CT6 \le 109.93;$$

$$13.22 \le TTL/T34 \le 27.12;$$

$$46.71 \le TTL/T67 \le 92.54;$$

wherein f is an effective focal length of the wide-angle lens assembly, f2 is an effective focal length of the second lens, f123 is an effective focal length of a combination of the first lens, the second lens, and the third lens, TTL is an interval from an object side surface of the first lens to an image plane along the optical axis, R21 is a radius of curvature of an object side surface of the second lens, R22 is a radius of curvature of an image side surface of the second lens, R61 is a radius of curvature of an object side surface of the sixth lens, R62 is a radius of curvature of an image side surface of the sixth lens, CT2 is an interval from the object side surface of the second lens to the image side surface of the second lens along the optical axis, CT6 is an interval from the object side surface of the sixth lens to the image side surface of the sixth lens along the optical axis, T34 is an interval from an image side surface of the third lens to an object side surface of the fourth lens along the optical axis, T67 is an interval from the image side surface of the sixth lens to an object side surface of the seventh lens along the optical axis, and θ is a half field of view of the wide-angle lens assembly.

7. The wide-angle lens assembly as claimed in claim 1, wherein the eighth lens is with negative refractive power.

8. The wide-angle lens assembly as claimed in claim 7, wherein:

the fifth lens comprises a concave surface facing the image side; and the seventh lens is a biconvex lens and further comprises another convex surface facing the object side.

9. The wide-angle lens assembly as claimed in claim 8, wherein the wide-angle lens assembly satisfies at least one of following conditions:

$$-14 < f2/f < 0;$$

$$2.5 \le TTL/f \le 4.5;$$

$$-11 < (R21+R22)/(R21-R22) < 0;$$

$$1 \le f123/f \le 3.2;$$

$$8.5\ \text{degrees/mm} \le 0/TTL \le 10\ \text{degrees/mm};$$

$$-10.99 \le (R21+R22)/CT2 \le -7.04;$$

$$39.16 \le (R61+R62)/CT6 \le 109.93;$$

$$13.22 \le TTL/T34 \le 27.12;$$

$$46.71 \le TTL/T67 \le 92.54;$$

wherein fs an effective focal length of the wide-angle lens assembly, f2 is an effective focal length of the second lens, f123 is an effective focal length of a combination of the first lens, the second lens, and the third lens, TTL is an interval from an object side surface of the first lens to an image plane along the optical axis, R21 is a radius of curvature of an object side surface of the second lens, R22 is a radius of curvature of an image side surface of the second lens, R61 is a radius of curvature of an object side surface of the sixth lens, R62 is a radius of curvature of an image side surface of the sixth lens, CT2 is an interval from the object side surface of the second lens to the image side surface of the second lens along the optical axis, CT6 is an interval from the object side surface of the sixth lens to the image side surface of the sixth lens along the optical axis, T34 is an interval from an image side surface of the third lens to an object side surface of the fourth lens along the optical axis, T67 is an interval from the image side surface of the sixth lens to an object side surface of the seventh lens along the optical axis, and θ is a half field of view of the wide-angle lens assembly.

10. The wide-angle lens assembly as claimed in claim 1, wherein:

the third lens is a biconvex lens and comprises a convex surface facing the object side;

the fifth lens comprises a concave surface facing the object side; and the eighth lens is a meniscus lens and further comprises a concave surface facing the image side.

11. The wide-angle lens assembly as claimed in claim 10, wherein:

the first lens is a meniscus lens and comprises a convex surface facing the object side and a concave surface facing the image side;

the fourth lens is a biconvex lens and comprises a convex surface facing the object side and another convex surface facing the image side; and the sixth lens is a meniscus lens and comprises a convex surface facing the object side and a concave surface facing the image side.

12. The wide-angle lens assembly as claimed in claim 11, wherein the wide-angle lens assembly satisfies at least one of following conditions:

$$-14<f2/f<0;$$

$$2.5\leq TTL/f\leq 4.5;$$

$$-11<(R21+R22)/(R21-R22)<0;$$

$$1\leq f123/f\leq 3.2;$$

$$8.5\text{ degrees/mm}\leq\theta/TTL\leq 10\text{ degrees/mm};$$

$$-10.99\leq(R21+R22)/CT2\leq-7.04;$$

$$39.16\leq(R61+R62)/CT6\leq 109.93;$$

$$13.22\leq TTL/T34\leq 27.12;$$

$$46.71\leq TTL/T67\leq 92.54;$$

wherein f is an effective focal length of the wide-angle lens assembly, f2 is an effective focal length of the second lens, f123 is an effective focal length of a combination of the first lens, the second lens, and the third lens, TTL is an interval from an object side surface of the first lens to an image plane along the optical axis, R21 is a radius of curvature of an object side surface of the second lens, R22 is a radius of curvature of an image side surface of the second lens, R61 is a radius of curvature of an object side surface of the sixth lens, R62 is a radius of curvature of an image side surface of the sixth lens, CT2 is an interval from the object side surface of the second lens to the image side surface of the second lens along the optical axis, CT6 is an interval from the object side surface of the sixth lens to the image side surface of the sixth lens along the optical axis, T34 is an interval from an image side surface of the third lens to an object side surface of the fourth lens along the optical axis, T67 is an interval from the image side surface of the sixth lens to an object side surface of the seventh lens along the optical axis, and θ is a half field of view of the wide-angle lens assembly.

13. The wide-angle lens assembly as claimed in claim 1, wherein the sixth lens is with negative refractive power.

14. The wide-angle lens assembly as claimed in claim 13, wherein:

the fifth lens comprises a convex surface facing the image side; and the seventh lens is a biconvex lens and further comprises another convex surface facing the object side.

15. The wide-angle lens assembly as claimed in claim 14, wherein the wide-angle lens assembly satisfies at least one of following conditions:

$$-14<f2/f<0;$$

$$2.5\leq TTL/f\leq 4.5;$$

$$-11<(R21+R22)/(R21-R22)<0;$$

$$1\leq f123/f\leq 3.2;$$

$$8.5\text{ degrees/mm}\leq\theta/TTL\leq 10\text{ degrees/mm};$$

$$-10.99\leq(R21+R22)/CT2\leq-7.04;$$

$$39.16\leq(R61+R62)/CT6\leq 109.93;$$

$$13.22\leq TTL/T34\leq 27.12;$$

$$46.71\leq TTL/T67\leq 92.54;$$

wherein f is an effective focal length of the wide-angle lens assembly, f2 is an effective focal length of the second lens, f123 is an effective focal length of a combination of the first lens, the second lens, and the third lens, TTL is an interval from an object side surface of the first lens to an image plane along the optical axis, R21 is a radius of curvature of an object side surface of the second lens, R22 is a radius of curvature of an image side surface of the second lens, R61 is a radius of curvature of an object side surface of the sixth lens, R62 is a radius of curvature of an image side surface of the sixth lens, CT2 is an interval from the object side surface of the second lens to the image side surface of the second lens along the optical axis, CT6 is an interval from the object side surface of the sixth lens to the image side surface of the sixth lens along the optical axis, T34 is an interval from an image side surface of the third lens to an object side surface of the fourth lens along the optical axis, T67 is an interval from the image side surface of the sixth lens to an object side surface of the seventh lens along the optical axis, and θ is a half field of view of the wide-angle lens assembly.

16. The wide-angle lens assembly as claimed in claim 1, wherein the eighth lens is with positive refractive power.

17. The wide-angle lens assembly as claimed in claim 16, wherein the wide-angle lens assembly satisfies at least one of following conditions:

$$-14<f2/f<0;$$

$$2.5\leq TTL/f\leq 4.5;$$

$$-11<(R21+R22)/(R21-R22)<0;$$

$$1\leq f123/f\leq 3.2;$$

$$8.5\text{ degrees/mm}\leq\theta/TTL\leq 10\text{ degrees/mm};$$

$$-10.99\leq(R21+R22)/CT2\leq-7.04;$$

$$39.16\leq(R61+R62)/CT6\leq 109.93;$$

$$13.22\leq TTL/T34\leq 27.12;$$

$$46.71\leq TTL/T67\leq 92.54;$$

wherein f is an effective focal length of the wide-angle lens assembly, f2 is an effective focal length of the second lens, f123 is an effective focal length of a combination of the first lens, the second lens, and the third lens, TTL is an interval from an object side surface of the first lens to an image plane along the optical axis, R21 is a radius of curvature of an object side surface of the second lens, R22 is a radius of curvature of an image side surface of the second lens, R61 is a radius of curvature of an object side surface of the sixth lens, R62 is a radius of curvature of an image side surface of the sixth lens, CT2 is an interval from the object side surface of the second lens to the image side surface of the second lens along the optical axis, CT6 is an interval from the object side surface of the sixth lens to the image side surface of the sixth lens along the optical axis, T34 is an interval from an image side surface of the third lens to an object side surface of the fourth lens along the optical axis, T67 is an interval from the image side surface of the sixth lens to an object side surface of the seventh lens along the optical axis, and θ is a half field of view of the wide-angle lens assembly.

18. The wide-angle lens assembly as claimed in claim 1, further comprising a stop disposed between the third lens and the fourth lens.

19. A wide-angle lens assembly comprising:

a first lens which is a meniscus lens with negative refractive power;

a second lens which is a meniscus lens with refractive power and comprises a concave surface facing an object side and a convex surface facing an image side;

a third lens which is with positive refractive power;

a fourth lens which is with positive refractive power;

a fifth lens which is with negative refractive power;

a sixth lens which is with refractive power;

a seventh lens which is with positive refractive power and comprises a convex surface facing the image side; and an eighth lens which is with refractive power and comprises a convex surface facing the object side;

wherein the first lens, the second lens, the third lens, the fourth lens, the fifth lens, the sixth lens, the seventh lens, and the eighth lens are arranged in order from the object side to the image side along an optical axis;

wherein the first lens, the second lens, the third lens, the fourth lens, the fifth lens, the sixth lens, the seventh lens, and the eighth lens are spaced apart with air gaps formed therebetween;

wherein the second lens is with negative refractive power;

wherein the sixth lens is with positive refractive power.

20. A wide-angle lens assembly comprising:

a first lens which is a meniscus lens with negative refractive power;

a second lens which is a meniscus lens with refractive power and comprises a concave surface facing an object side and a convex surface facing an image side;

a third lens which is with positive refractive power;

a fourth lens which is with positive refractive power;

a fifth lens which is with negative refractive power;

a sixth lens which is with refractive power;

a seventh lens which is with positive refractive power and comprises a convex surface facing the image side; and an eighth lens which is with refractive power and comprises a convex surface facing the object side;

wherein the first lens, the second lens, the third lens, the fourth lens, the fifth lens, the sixth lens, the seventh lens, and the eighth lens are arranged in order from the object side to the image side along an optical axis;

wherein the first lens, the second lens, the third lens, the fourth lens, the fifth lens, the sixth lens, the seventh lens, and the eighth lens are spaced apart with air gaps formed therebetween;

wherein the second lens is with negative refractive power;

wherein the eighth lens is with positive refractive power.

* * * * *